(12) United States Patent
Godfrey

(10) Patent No.: US 11,188,128 B2
(45) Date of Patent: Nov. 30, 2021

(54) CONVERTIBLE ELECTRONIC APPARATUS

(71) Applicant: Lenovo (Singapore) Pte. Ltd., New Tech Park (SG)

(72) Inventor: Cyan Godfrey, Chapel Hill, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 579 days.

(21) Appl. No.: 15/381,229

(22) Filed: Dec. 16, 2016

(65) Prior Publication Data

US 2018/0107254 A1 Apr. 19, 2018

Related U.S. Application Data

(63) Continuation-in-part of application No. 15/295,176, filed on Oct. 17, 2016.

(51) Int. Cl.
*G06F 1/16* (2006.01)
(52) U.S. Cl.
CPC ............ *G06F 1/1681* (2013.01); *G06F 1/162* (2013.01); *G06F 1/1654* (2013.01)
(58) Field of Classification Search
CPC ...... G06F 1/1681; G06F 1/162; G06F 1/1643; G06F 1/1669
See application file for complete search history.

(56) References Cited

U.S. PATENT DOCUMENTS

| | | | | |
|---|---|---|---|---|
| 9,433,111 B2* | 8/2016 | Myung | ................ | H05K 5/0017 |
| 9,618,979 B1* | 4/2017 | Wang | .................... | G06F 1/1683 |
| 9,740,245 B2* | 8/2017 | Gault | .................... | G06F 1/1635 |
| 9,785,196 B1* | 10/2017 | Bowers | ................. | G06F 1/1679 |
| 2010/0123663 A1* | 5/2010 | Leung | ................... | G06F 1/1632 |
| | | | | 345/169 |
| 2013/0135352 A1* | 5/2013 | Matsuda | ................... | G06F 3/14 |
| | | | | 345/659 |
| 2013/0170126 A1* | 7/2013 | Lee | ........................ | G06F 1/1654 |
| | | | | 361/679.17 |
| 2014/0063710 A1* | 3/2014 | Myung | ................ | H05K 5/0017 |
| | | | | 361/679.4 |
| 2014/0273590 A1* | 9/2014 | Sharma | ................. | G06F 1/1669 |
| | | | | 439/350 |
| 2014/0285960 A1* | 9/2014 | Sharma | ................. | G06F 1/1654 |
| | | | | 361/679.28 |
| 2016/0252971 A1* | 9/2016 | Shirata | .................. | G06F 3/0219 |
| | | | | 345/168 |
| 2017/0131745 A1* | 5/2017 | Sharma | ................. | G06F 1/1669 |
| 2017/0344054 A1* | 11/2017 | Huang | .................... | G06F 1/162 |

* cited by examiner

*Primary Examiner* — James Wu
*Assistant Examiner* — Hung Q Dang
(74) *Attorney, Agent, or Firm* — The Small Patent Law Group LLC; Dean D. Small

(57) ABSTRACT

An electronic apparatus includes a display subassembly including display device that visually presents information and a connector, a base subassembly including a housing having a connector recess that receives the connector of the display subassembly, and one or more processors that control presentation of the information on the display subassembly. The connector of the display subassembly is sized to be at least partially received into the connector recess of the base subassembly to connect the display subassembly with the base subassembly while allowing the display subassembly to pivot relative to the base subassembly.

21 Claims, 15 Drawing Sheets

US 11,188,128 B2

CONVERTIBLE ELECTRONIC APPARATUS

CROSS-REFERENCE TO RELATED APPLICATIONS

This application is a continuation-in-part of U.S. patent application Ser. No. 15/295,176, filed 17 Oct. 2016, the entire disclosure of which is incorporated herein by reference.

BACKGROUND

Embodiments of the present disclosure generally relate to electronic assemblies and more particularly to electronic assemblies that convert between a state in which an input device is exposed and a different state in which the input device is hidden.

A wide variety of electronic assemblies are offered today. Examples of electronic assemblies include computers (e.g., laptop or tablet computers), electronic games, and the like. Some assemblies include laptop computers that partially convert to tablet computers by folding keyboards behind the display devices of the laptop computers. But, doing so diminishes performance of the tablet operation in that the keys of the keyboard are still exposed behind the display device, which may not be preferable to users of the assemblies.

Tablet computers may attach to keyboards along one of the longer edges of the tablet computers. Because the majority of the weight of the combination of the tablet computer and keyboard may be in the tablet computer, this combination becomes top heavy, and may require a kickstand or other support to maintain the tablet computer at a useful angle with respect to the keyboard.

Some electronic assemblies include additional input devices, such as styluses, to provide users with different modes of inputting information into the assemblies. But, these additional input devices are often misplaced. Some efforts to reduce loss of the input devices involve using magnets to attach the devices to the assemblies. These magnets may not secure the input devices to the assemblies, and often result in detachment and loss of the input devices.

SUMMARY

In one embodiment, an electronic apparatus includes a display subassembly including display device that visually presents information and a connector, a base subassembly including a housing having a connector recess that receives the connector of the display subassembly, and one or more processors that control presentation of the information on the display subassembly. The connector of the display subassembly is sized to be at least partially received into the connector recess of the base subassembly to connect the display subassembly with the base subassembly while allowing the display subassembly to pivot relative to the base subassembly.

In one embodiment, an electronic subassembly includes a housing having a connector recess that receives a connector of a display subassembly, and one or more processors that control presentation of information on the display subassembly. The connector recess of the housing is sized to at least partially receive the connector of the display subassembly to connect the display subassembly with the one or more processors while allowing the display subassembly to pivot relative to the housing.

In one embodiment, an electronic subassembly includes a display device that visually presents information, a housing with one or more processors that control presentation of the information on the display device, and a connector sized to be at least partially received into a connector recess of a base subassembly to connect the housing with the base subassembly while allowing the housing to pivot relative to the base subassembly.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Figure 1:
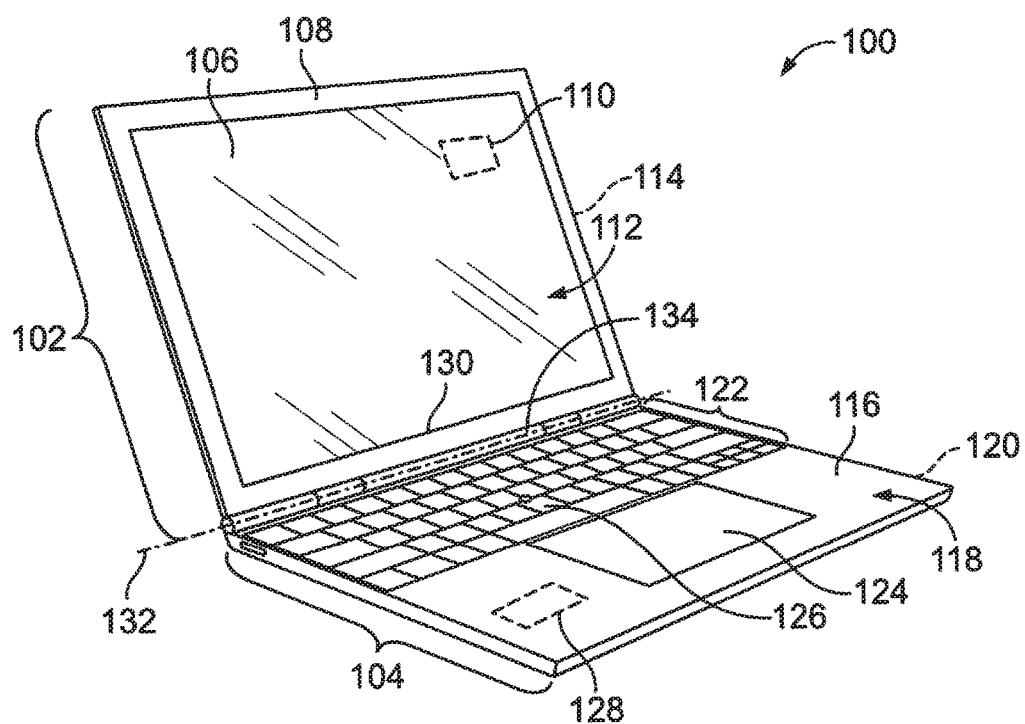
FIG. 1 illustrates a perspective view of a convertible electronic apparatus formed in accordance with an embodiment described herein.

FIG. 1 illustrates a perspective view of an electronic apparatus 100 formed in accordance with an embodiment described herein. The electronic apparatus 100 includes a display subassembly 102 and a base subassembly 104 that are coupled with each other in the state of the electronic apparatus 100 shown in FIG. 1. The display subassembly 102 may be a tablet computer or other electronic device having a display device 106 and a housing 108 coupled with the display device 106. The display device 106 may be a touchscreen or non-touch sensitive display. The display device 106 visually presents information to a user of the electronic apparatus 100 or the display subassembly 102.

The housing 108 forms part of the exterior surface of the display subassembly 102. The display device 106 is disposed on a front or display side 112 of the housing 108. The housing 108 also includes an opposite rear or non-display side 114. One or more processors 110 may be disposed inside the housing 108 between the sides 112, 114. The processors 110 may receive input (e.g., from the display device 106 and/or other input devices) to control the information that is shown on the display device 106. The processors 110 can represent one or more microprocessors, integrated circuits, field programmable gate arrays, or the like.

The base subassembly 104 includes a housing 116 that couples with the housing 108 of the display subassembly 102. The housing 116 forms at least part of the exterior surface of the base subassembly 104. The housing 116 has an input side 118 and an opposite back side 120. One or more input devices 122, 124 connected with the housing 116 and accessible to a user of the base subassembly 104 on or via the input side 118 of the housing 116. In the illustrated embodiment, the input device 122 is a keyboard having one or more keys 126 and the input device 124 is a touch sensitive surface. The keys 126 may be depressed or otherwise actuated by a user and/or the input device 124 may be touched by the user to provide input to the electronic apparatus 100. Optionally, one or more other input devices may be included.

In one embodiment, the base subassembly 104 also includes one or more processors 128 in the housing 116. These processors 128 may be similar or identical to the processors 110 in the display subassembly 102. Alternatively, the processors 128 may have more processing capability (e.g., power) relative to the processors 110. The processors 110 and/or the processors 128 may receive signals from the input devices 122, 124 and/or the display device 106, and can control perform operations based on or using these signals, such as by controlling the information presented on the display device 106.

The electronic apparatus 100 may operate as a laptop computer or other electronic device in the state shown in FIG. 1. This state may be referred to as an exposed state because the input devices 122, 124 are exposed and available for a user of the electronic apparatus 100 to actuate for providing input to the processors 110 and/or 128. The input devices 122, 124 are interposed between the display side 112 of the electronic subassembly 102 and the back side 120 of the base subassembly 104 in the exposed state. For example, the input devices 122, 124 are between the display side 112 of the electronic subassembly 102 and the back side 120 of the base subassembly 104 without the back side 114 of the display subassembly 102 also being between the display side 112 of the electronic subassembly 102 and the back side 120 of the base subassembly 104. This allows for both the display side 112, the display device 106, and the input devices 122, 124 to be concurrently or simultaneously visible and accessible to a user of the electronic apparatus 102.

The display subassembly 102 and the base subassembly 104 are connected with each other along an elongated connector assembly or hinge assembly 130. This connection allows the display subassembly 102 and the base subassembly 104 to pivot relative to each other in directions around or about an axis 132 extending along the hinge assembly 130. This hinge assembly 130 provides for the ability to pivot the subassemblies 102, 104 relative to each other to a variety of angles (as shown and described below in connection with FIG. 3), to maintain the orientation of the subassemblies 102, 104 relative to each other, and/or to transfer data and/or electrical power (e.g., current) between the subassemblies 102, 104.

In one embodiment, an input device 134 is included in the electronic apparatus 100 along or at the hinge assembly 130. This input device 134 can be a stylus device that is coupled with the housing 108 of the display subassembly 102, or with the housing 116 of the base subassembly 104 as described below. Such a device can be referred to as a stylus device.

The input device 134 may be located at or along the hinge assembly 130 while the display subassembly 102 pivots around the axis 132 relative to the base subassembly 104 and/or the base subassembly 104 pivots around the axis 132 relative to the display subassembly 102. For example, the presence of the input device 134 at the hinge assembly 130 may not interfere with or prevent pivoting of either the display subassembly 102 or the base subassembly 104.

Figure 2:
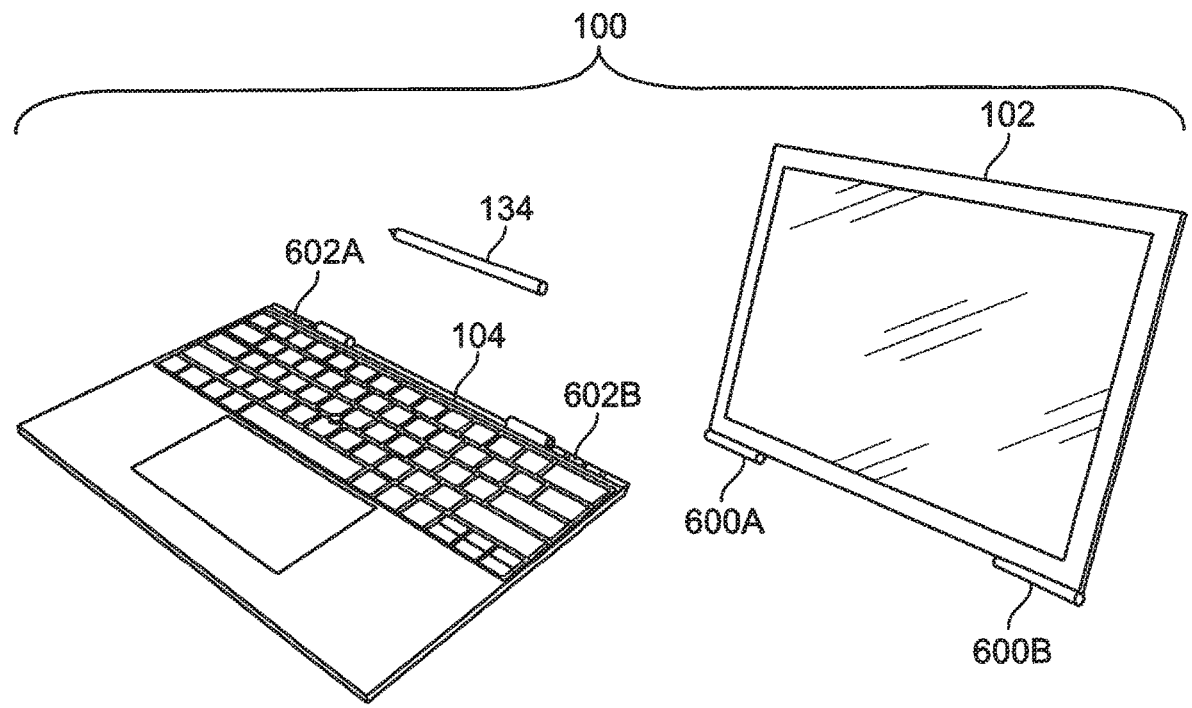
FIG. 2 illustrates one embodiment of an exploded view of the electronic apparatus shown in FIG. 1.

FIG. 2 illustrates one embodiment of an exploded view of the electronic apparatus 100 shown in FIG. 1. The display subassembly 102 and the base subassembly 104 may be separated from each other by pulling the display subassembly 102 away from the base subassembly 104 and/or by pulling the base subassembly 104 away from the display subassembly 102. For example, the display subassembly 102 may be pulled away from the base subassembly 104 and/or the base subassembly 104 may be pulled away from the display subassembly 102 in directions that are orthogonal to the axis 132 (shown in FIG. 1). Hinge recesses 602A, 602B and hinge sections 600A, 600B shown in FIG. 2 are described below in connection with FIG. 6.

The input device 134 may be removed from the base subassembly 104 for use with the display subassembly 102. For example, the display subassembly 102 may operate as a tablet computer with the input device 134 and/or touch by a user on the display device 106 used to provide input to the processors 110 in the display subassembly 102. Alternately, the hinge sections 600A and 600B could be positioned closer together to hold the pen 134, with the fixed hinge sections on the base 104 moving apart to sit outside of 600A and 600B.

Figure 3:
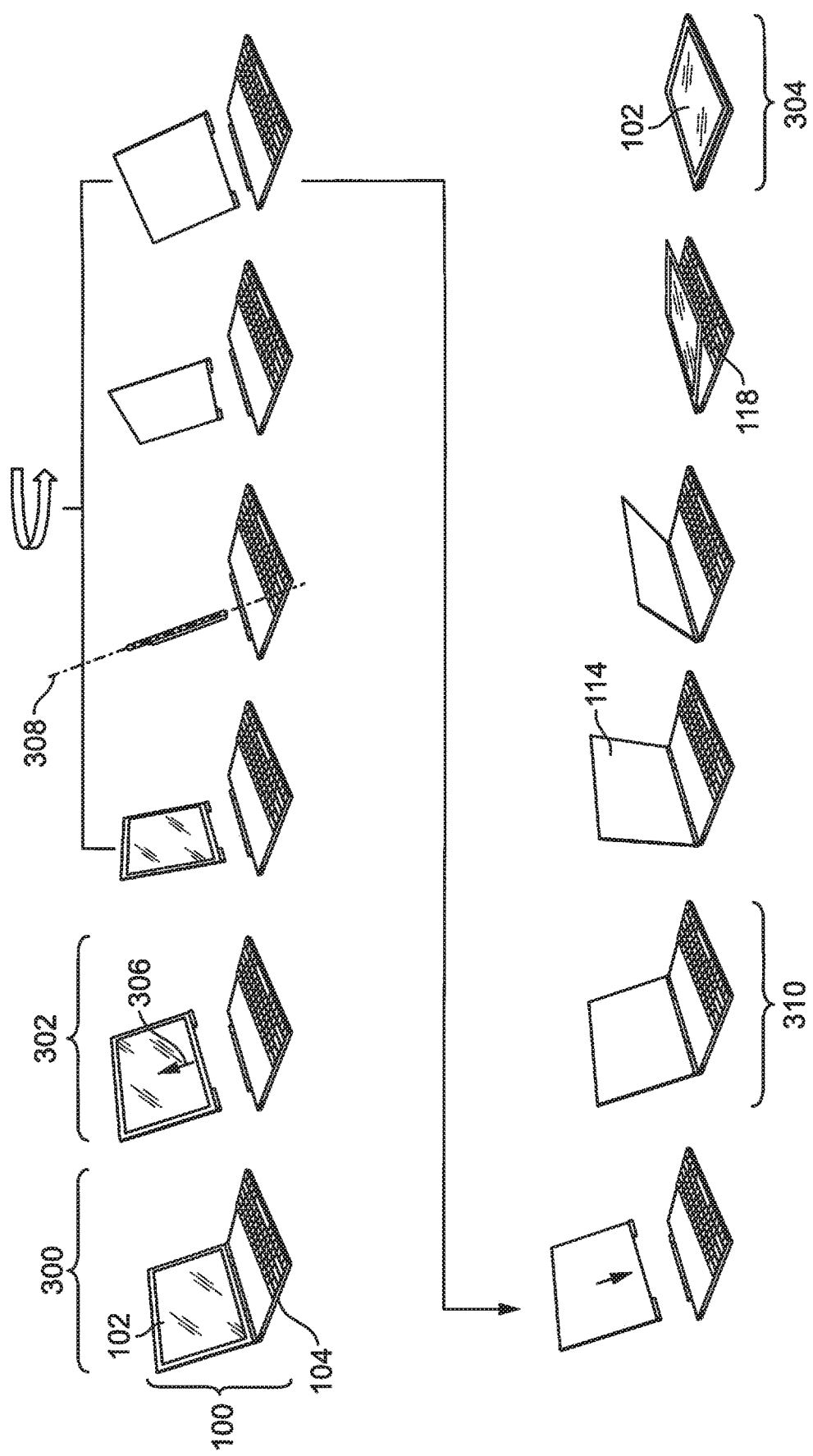
FIG. 3 illustrates one embodiment of transitions of the electronic apparatus from a combined, exposed state to a separated state, and from the separated state to a combined, hidden state.

FIG. 3 illustrates one embodiment of a transition of the electronic apparatus 100 from a combined, exposed state 300 to a separated state 302, and from the separated state 302 to a combined, hidden state 304. In the combined, exposed state 300, the display subassembly 102 and the base subassembly 104 are coupled with each other with the input devices 122, 124 (not labeled in FIG. 3) of the base subassembly 104 and the display device 106 (not labeled in FIG. 3) visible to a user of the electronic apparatus 100. The electronic apparatus 100 may operate as a laptop computer in the combined, exposed state.

The display subassembly 102 may be separated from the base subassembly 104 by pulling the display subassembly 102 away from the base subassembly 104 along a direction 306 that is orthogonal to the hinge axis 132 (and/or by pulling the base subassembly 104 away from the display subassembly 102 along an opposite direction). This action transitions the electronic apparatus 100 from the combined, exposed state 300 to the separated state 302. In the separated state 302, the display subassembly 102 may continue to operate by receiving touch input from a user and visually presenting information to the user on the display device 106. For example, the display subassembly 102 can operate as a tablet computer (or it could be purely a display and non-functional when disconnected).

The electronic apparatus 100 can change from the separated state 302 to the combined, hidden state 304 by rotating the display subassembly 102 around a transition axis 308. This transition axis 308 may be perpendicular to the hinge axis 132 (not labeled in FIG. 3), and may be parallel to the direction in which the display subassembly 102 and/or the base subassembly 104 are moved to separate from each other. In one embodiment, the display subassembly 102 may rotate 180 degrees. Optionally, the electronic apparatus 100 can transition from the separated state 302 to the combined, hidden state 304 by rotating the base subassembly 104 around another axis that is perpendicular to the hinge axis 132 and/or that is parallel to the direction in which the base subassembly 104 is moved to separate from the display subassembly 102.

After this rotation, the display subassembly 102 may be facing in an opposite direction relative to a time prior to the rotation. The display subassembly 102 may then be re-combined with the base subassembly 104 along the hinge assembly 130 (not labeled in FIG. 3). The electronic apparatus 100 is now in a re-combined state 310. This state 310 optionally may be referred to as a tent state, as the electronic apparatus 100 may be placed onto a surface with the hinge assembly 130 above the remainder of the electronic apparatus 100 for use by a user.

The display subassembly 102 and the base subassembly 104 may pivot about the hinge axis 132 toward each other to transition from the tent state 310 to the combined, hidden state 304. The display subassembly 102 and/or the base subassembly 104 may move toward each other so that the input side 118 of the base subassembly 104 faces the back side 114 of the display subassembly 102. In one embodiment, the display subassembly 102 and/or the base subassembly 104 may pivot toward each other until the input side 118 of the base subassembly 104 engages or abuts the back side 114 of the display subassembly 102. In this state 304, the input devices 122, 124 are not visible or accessible to a user that is operating the electronic apparatus 100. For example, the keys 126 (not labeled in FIG. 3) of the input device 122 and/or the input device 124 may be interposed between the back side 114 of the display subassembly 102 and the back side 120 (not labeled in FIG. 3) of the base subassembly 104. Optionally, the display subassembly 102 and the base subassembly 104 may pivot about the hinge axis 132 away from each other to transition to a flat state, where the subassemblies 102, 104 are co-planar or substantially co-planar.

Figure 4:
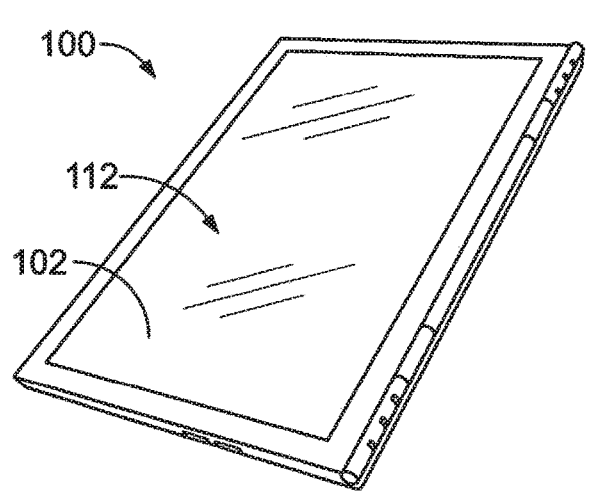
FIG. 4 illustrates a front perspective view of one embodiment of the electronic apparatus shown in FIG. 1 in the combined, hidden state.
Figure 5:
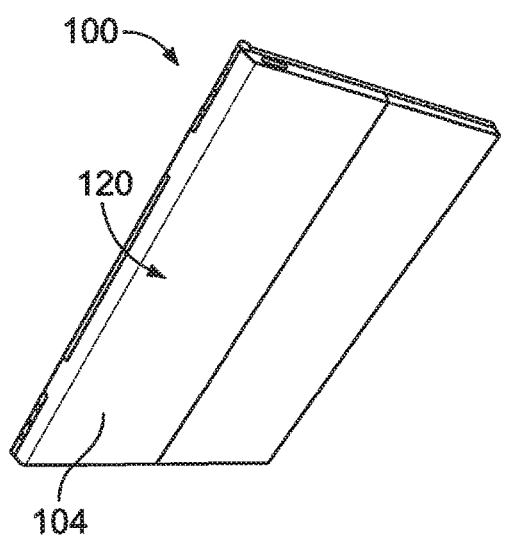
FIG. 5 illustrates a rear perspective view of one embodiment of the electronic apparatus shown in FIG. 1 in the combined, hidden state.

FIG. 4 illustrates a front perspective view of one embodiment of the electronic apparatus 100 in the combined, hidden state 304. FIG. 5 illustrates a rear perspective view of one embodiment of the electronic apparatus 100 in the combined, hidden state 304. The input devices 122, 124 (shown in FIG. 1) may be located between the back side 114 (not shown in FIG. 4 or 5) of the display subassembly 102 and the back side 120 of the base subassembly 104 without the display side 112 of the display subassembly 102 being located between the back side 114 of the display subassembly 102 and the back side 120 of the base subassembly 104. The electronic apparatus 100 may be operated in this state 304 as a tablet computer without the input devices 122, 124 being able to be touched or felt by a user of the electronic apparatus 100.

Figure 6:
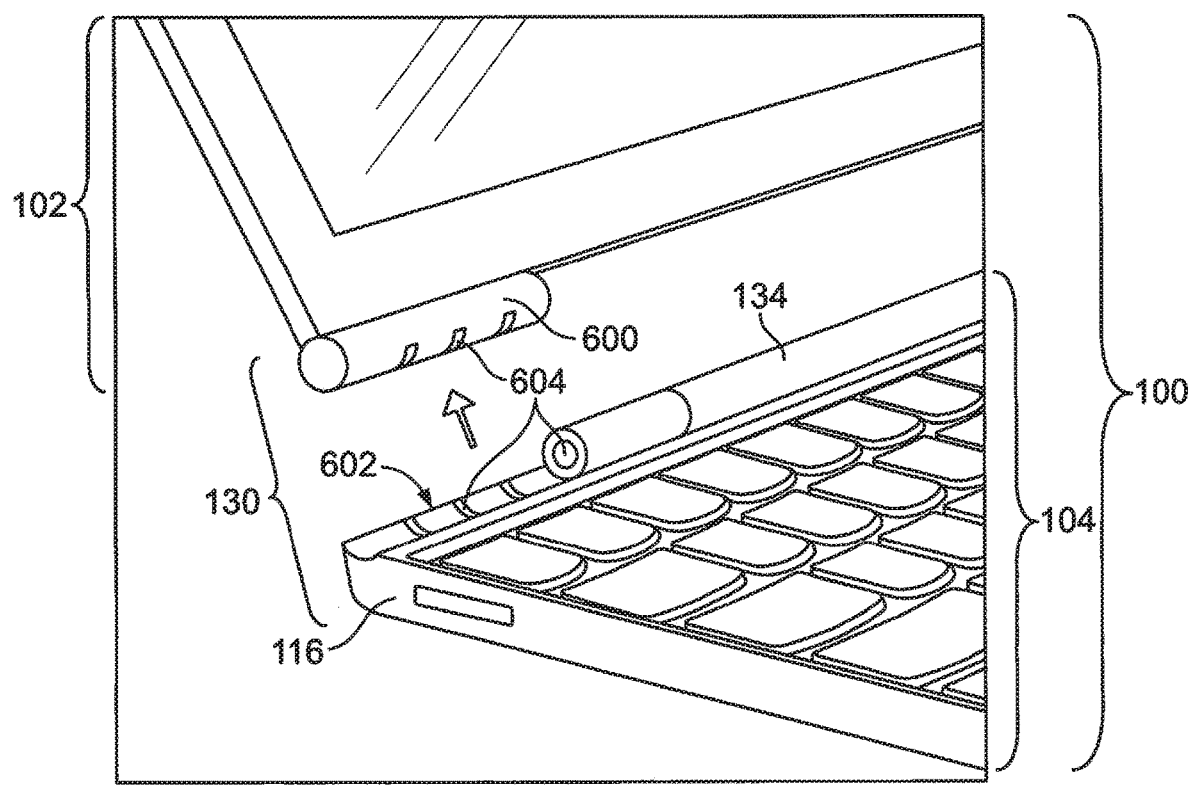
FIG. 6 illustrates a partial view of a hinge assembly shown in FIG. 1 of the electronic apparatus between a display subassembly and a base subassembly both shown in FIG. 1 according to one embodiment.

FIG. 6 illustrates a partial view of the hinge assembly 130 of the electronic apparatus 100 between the display subassembly 102 and the base subassembly 104 according to one embodiment. The hinge assembly 130 includes components of both the display subassembly 102 and the base subassembly 104 in one embodiment. With respect to the display subassembly 102, the hinge assembly 130 includes cylindrical hinge sections or bodies 600 that couple with the base subassembly 104 to connect the display subassembly 102 with the base subassembly 104. The hinge sections 600 are cylinder-shaped bodies that are elongated along the hinge axis 132 of the hinge assembly 130. With respect to the base subassembly 104, the hinge assembly 130 includes hinge recesses 602 that couple with the display subassembly 102 to connect the display subassembly 102 with the base subassembly 104. The hinge recesses 602 are elongated, cylinder-shaped concave recesses that extend into the housing 116 of the base subassembly 104. Alternatively, the hinge sections 600 may be part of the base subassembly 104 and the hinge recesses may be part of the display subassembly 102.

The hinge sections 600 and the hinge recesses 602 have complementary shapes in that the hinge sections 600 fit into the hinge recesses 602 while engaging the surfaces inside the hinge recesses 602. The hinge sections 600 may rotate within and relative to the hinge recesses 602 to allow the display subassembly to pivot relative to the base subassembly. The hinge sections 600 and/or the housing 116 of the base subassembly 104 (e.g., beneath the hinge recesses 602) may include magnetic bodies to magnetically couple the display subassembly 102 with the base subassembly 104. The display subassembly 102 and the base subassembly 104 may be coupled with each other by placing the hinge sections 600 into the hinge recesses 602. In one embodiment, the magnetic bodies may be sufficiently strong to maintain the orientation (e.g., screen angle) of the display subassembly 102 relative to the base subassembly 104.

In the illustrated embodiment, the hinge sections 600 and the hinge recesses 602 include conductive contacts 604 that engage each other while the display subassembly 102 and the base subassembly 104 are connected with each other. The contacts 604 in the hinge sections 600 may be conductively coupled (e.g., by wires, busses, etc.) with the display device 106, the processors 110, and/or other components of the display subassembly 102 and the contacts 604 in the hinge recesses 602 may be conductively coupled (e.g., by wires, busses, etc.) with the processors 128, the input devices 122, 124, and/or other components of the base subassembly 104. This allows the display device 106, the processors 110, and/or other components of the display subassembly 102 to communicate with the processors 128, the input devices 122, 124, and/or other components of the base subassembly 104.

The locations of the hinge sections 600 and the hinge recesses 602 on the display subassembly 102 and the base subassembly 104 allow for the display subassembly 102 to be separated from the base subassembly 104, rotated 180 degrees, and re-connected with the base subassembly 104, as described above. For example, as shown in FIG. 2, the display subassembly 102 may include two hinge sections 600A, 600B (with each hinge section 600A, 600B representing a different or separate hinge section 600 shown in FIG. 6). The base subassembly 104 may include two hinge recesses 602A, 602B (with each hinge recess 602A, 602B representing a different or separate hinge recess 602 shown in FIG. 6).

Different hinge sections 600 may couple with different hinge recesses 602 depending on the state of the electronic apparatus 100. For example, in the combined, exposed state shown in FIG. 1, the hinge section 600A may sit in the hinge recess 602A and the hinge section 600B may sit in the hinge recess 602B. When the display subassembly 102 is separated from the base subassembly 104, flipped or rotated, and re-connected with the base subassembly 104 to put the electronic assembly 100 in the combined, hidden state shown in FIGS. 4 and 5, the hinge sections 600 may sit in other, different hinge recesses 602. The hinge section 600A may sit in the hinge recess 602B and the hinge section 600B may sit in the hinge recess 602A. The contacts 604 of each hinge section 600 may be in the same locations, and the contacts 604 of each hinge recess 602 may be in the same location to allow the contacts 604 to connect with each other regardless of whether the electronic apparatus 100 is in the exposed state or the hidden state.

Figure 7:
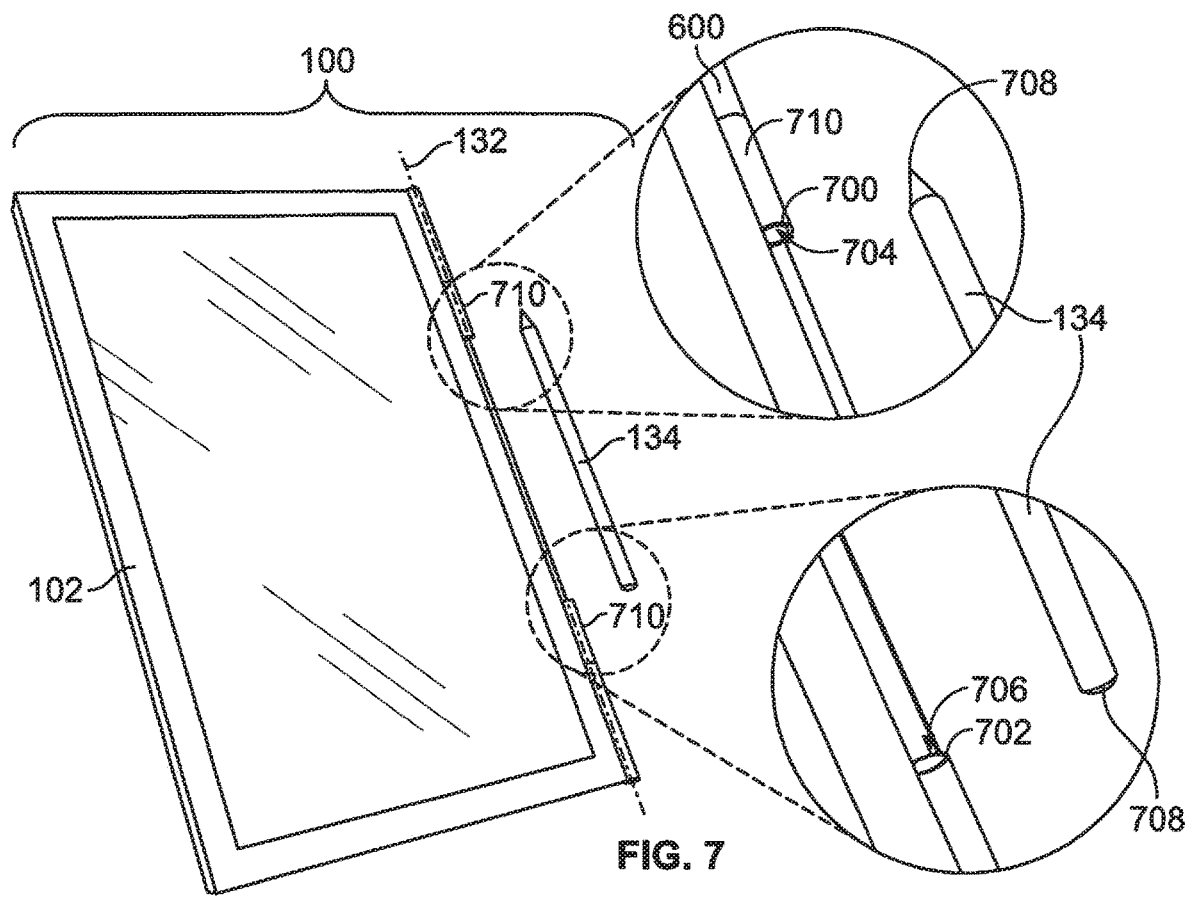
FIG. 7 illustrates coupling of an input device of the electronic apparatus shown in FIG. 1 with the display subassembly according to one embodiment.

FIG. 7 illustrates coupling of the input device 134 of the electronic apparatus 100 with the base subassembly 104 according to one embodiment. The input device 134 may be coupled with the display subassembly 102 in the hinge assembly 130 (shown in FIG. 1) between neighboring hinge sections 600. The base subassembly 104 includes securing sections 710 within the hinge assembly 130. The securing sections 710 may be cylindrical bodies or extensions of the housing 116 that are shaped similarly to the hinge sections 600. Alternatively, the securing sections 710 may have another shape. As shown in FIG. 6, one or more of the securing sections 710 may include contacts 604 that engage contacts 604 in the hinge sections 600 of the display subassembly 102.

The securing sections 710 include opposing ends 700, 702 that face each other and that are spaced apart from each other. The input device 134 may be coupled with the base subassembly 104 within the space between the securing sections 710. As shown in FIG. 7, the hinge sections 600 may neighbor or be adjacent to the securing sections 710 in the combined states of the electronic apparatus 100.

The ends 700, 702 of the securing sections 710 include recesses 704, 706 that are shaped to receive opposite ends 708 of the input device 134. These recesses 704, 706 may have the same shape and/or size, or may have different shapes and/or sizes. For example, the recess 704 may have a conical shape to receive and engage a writing end 708 of the input device 134, while the recess 706 may have a rounded, non-conical shape to receive and engage a rounded end 710 of the input device 134.

One of the ends 708 of the input device 134 is inserted into one of the recesses 704 or 706, and the other end 708 of the input device 134 is inserted (e.g., snapped) into the other of the recesses 706 or 704 to secure the input device 134 to the base subassembly 104. In one embodiment, the distance between the ends 700, 702 of the securing sections 710 along or parallel to the hinge axis 132 is no greater than the distance between the ends 708 of the input device 134 (along a center axis or direction along which the input device 134 is elongated). For example, the distance between the ends 700, 702 of the securing sections 710 may be smaller than the distance between the ends 708 of the input device 134 to secure the input device 134 between the securing sections 710. The hinge assembly 130 between the display subassembly 102 and the base subassembly 104 may be formed by a combination of the hinge sections 600, the securing sections 710, the hinge recesses 602, and the input device 134 when the input device 134 is coupled with the securing sections 710. Alternatively, the base subassembly 104 may have the hinge sections 600 and the display subassembly 102 may have the securing sections 710.

Optionally, the hinge sections 600 of the display subassembly 102 may engage the securing sections 710 of the base subassembly 104 to secure the subassemblies 102, 104 together. The hinge sections 600 may include one or more of the ends 708 of the stylus device that are received into the ends 700, 702 of the securing sections 710 to secure the subassemblies 102, 104 together. Friction forces between the hinge sections 600 and the securing sections 710 may hold or maintain the orientation of the display subassembly 102 relative to the base subassembly 104. Alternatively, the base subassembly 104 may have the hinge sections 600 and the display subassembly 102 may have the securing sections 710.

The securing sections 710 include opposing ends 700, 702 that face each other and that are spaced apart from each other. The input device 134 may be coupled with the base subassembly 104 within the space between the securing sections 710. As shown in FIG. 7, the hinge sections 600 may neighbor or be adjacent to the securing sections 710 in the combined states of the electronic apparatus 100.

The ends 700, 702 of the securing sections 710 include recesses 704, 706 that are shaped to receive opposite ends 708 of the input device 134. These recesses 704, 706 may have the same shape and/or size, or may have different shapes and/or sizes. For example, the recess 704 may have a conical shape to receive and engage a writing end 708 of the input device 134, while the recess 706 may have a rounded, non-conical shape to receive and engage a rounded end 710 of the input device 134.

One of the ends 708 of the input device 134 is inserted into one of the recesses 704 or 706, and the other end 708 of the input device 134 is inserted (e.g., snapped) into the other of the recesses 706 or 704 to secure the input device 134 to the base subassembly 104. In one embodiment, the distance between the ends 700, 702 of the securing sections 710 along or parallel to the hinge axis 132 is no greater than the distance between the ends 708 of the input device 134 (along a center axis or direction along which the input device 134 is elongated). For example, the distance between the ends 700, 702 of the securing sections 710 may be smaller than the distance between the ends 708 of the input device 134 to secure the input device 134 between the securing sections 710. The hinge assembly 130 between the display subassembly 102 and the base subassembly 104 may be formed by a combination of the hinge sections 600, the securing sections 710, the hinge recesses 602, and the input device 134 when the input device 134 is coupled with the securing sections 710.

Figure 8:
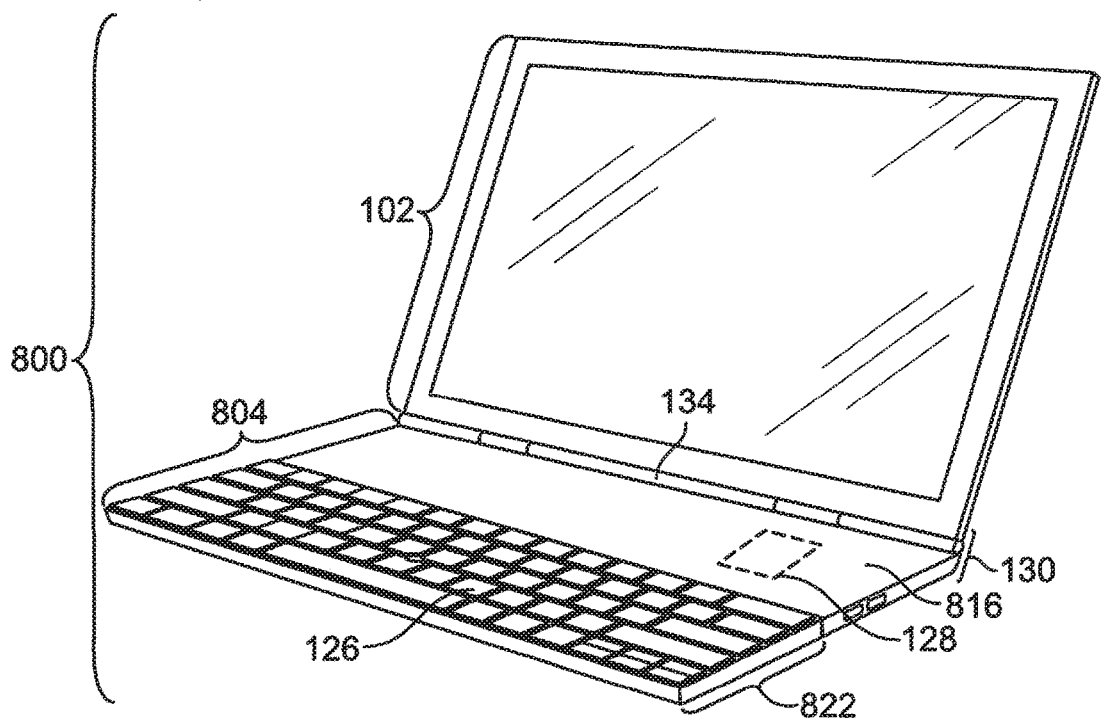
FIG. 8 illustrates a perspective view of an electronic apparatus formed in accordance with another embodiment described herein.

FIG. 8 illustrates a perspective view of an electronic apparatus 800 formed in accordance with another embodiment described herein. The electronic apparatus 800 may be similar to the electronic apparatus 100 shown in FIGS. 1 through 7 in that the electronic apparatus 800 includes the display subassembly 102 and a modular base subassembly 804 that are coupled with each other. The display subassembly 102 and the base subassembly 804 can detach from each other, the display subassembly 102 can rotated, and the display subassembly 102 and the base subassembly 804 can be re-attached in the combined, hidden state 304 (shown in FIG. 3), as described above in connection with the electronic apparatus 100. The display subassembly 102 and the base subassembly 804 may be connected with each other at the hinge assembly 130 that includes the input device 134.

One difference between the electronic apparatus 100 and the electronic apparatus 800 is the base subassembly 804. The base subassembly 804 is a modular base subassembly 804 in that different input devices or accessories can be connected with the base subassembly 804. In the illustrated example, the base subassembly 804 includes a housing 816 that is coupled with an input device 822. The input device 822 may be a keyboard having several keys 126. The housing 816 connects with the input device 822, and can connect with additional input devices, as described below. The processors 128 may be disposed in the housing 816 to communicate with the input devices and/or the display subassembly 102. Optionally, the input device 822 may be or may include an energy storage device, such as one or more batteries. The energy storage device can provide additional electric energy to power the base subassembly 104, 804 and/or the display subassembly 102.

Figure 9:
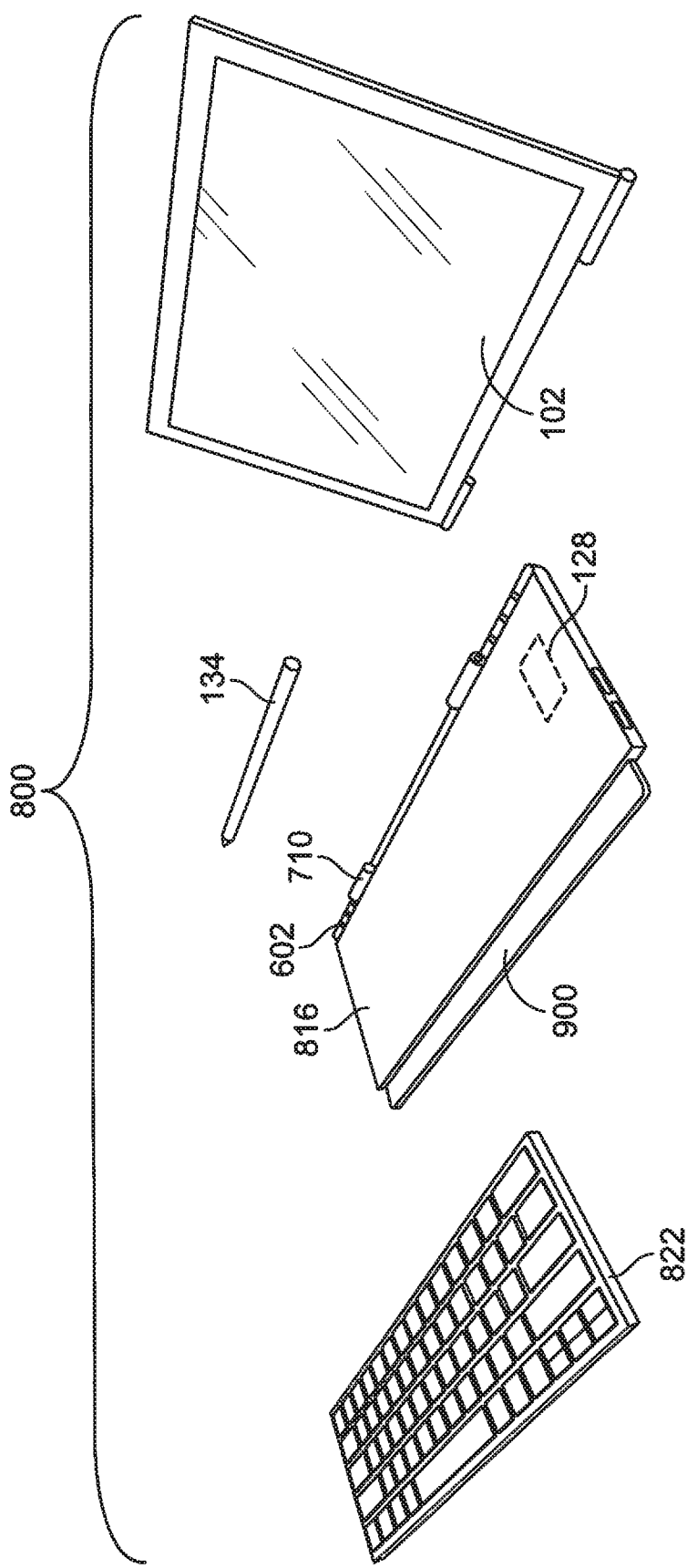
FIG. 9 illustrates an exploded view of the electronic apparatus shown in FIG. 8 according to one embodiment.

FIG. 9 illustrates an exploded view of the electronic apparatus 800 according to one embodiment. The housing 816 of the base subassembly 804 may include the hinge recesses 602 and securing sections 710 described above in connection with the base subassembly 104. The housing 816 also includes a connector 900 that mates with a corresponding connector or recess in the input device 822. The connector 900 may conductively couple the input device 822 with one or more components of the base subassembly 804, such as the processors 128.

Figure 10:
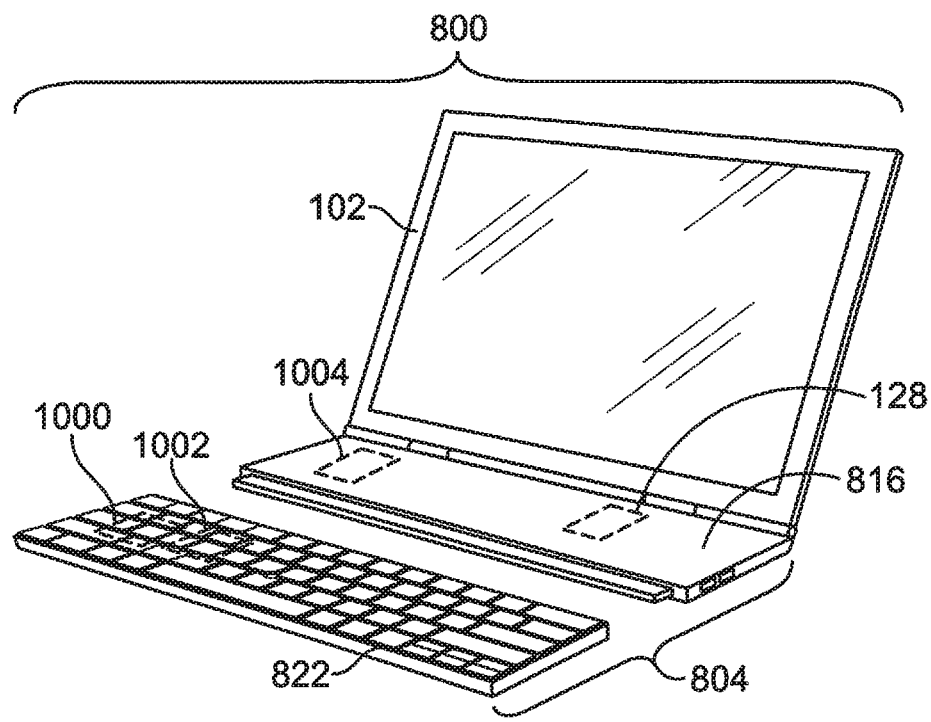
FIG. 10 illustrates the electronic apparatus shown in FIG. 8 in a separated state according to one embodiment.

FIG. 10 illustrates the electronic apparatus 800 in a separated state according to one embodiment. The input device 822 optionally may include one or more processors 1000 and transceiving circuitry 1002 (e.g., an antenna, modem, and other components that allow for wireless communication). Additional transceiving circuitry 1004 may be disposed in the housing 816 of the base subassembly 804. In one embodiment, the transceiving circuitry 1002, 1004 can establish a wireless connection, such as a BLUETOOTH connection. The transceiving circuitry 1002, 1004 in the input device 822 and the housing 816 can allow for the input device 822 to be separated from the housing 816 while still providing input to the processors 128 of the base subassembly 804 using the transceiving circuitry 1002.

Figure 11:
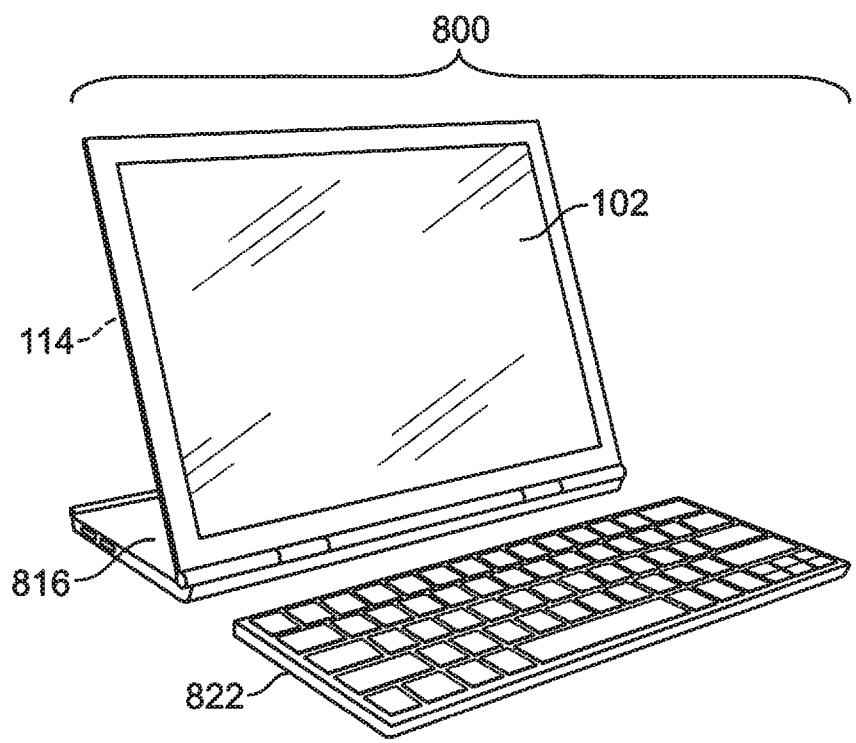
FIG. 11 illustrates the electronic apparatus shown in FIG. 8 in another separated state according to one embodiment.

FIG. 11 illustrates the electronic apparatus 800 in another separated state according to one embodiment. In contrast to the separated state shown in FIG. 10, the separated state shown in FIG. 11 includes the housing 816 of the base subassembly 804 folded back so that the housing 816 extends away in a rearward direction away from the back side 114 of the display subassembly 102. The input device 822 can wirelessly communicate with the processors 128 in the housing 816 of the base subassembly 804 to allow the user of the electronic apparatus 800 to continue controlling operation of the electronic apparatus 800 via the input device 822 while the input device 822 is separated from the housing 816.

The housing 816 of the base subassembly 804 can couple with different input devices and/or output devices. These devices may be interchanged with the housing 816 to provide a wide variety of options for input and/or output devices to use with the electronic apparatus 800.

Figure 12:
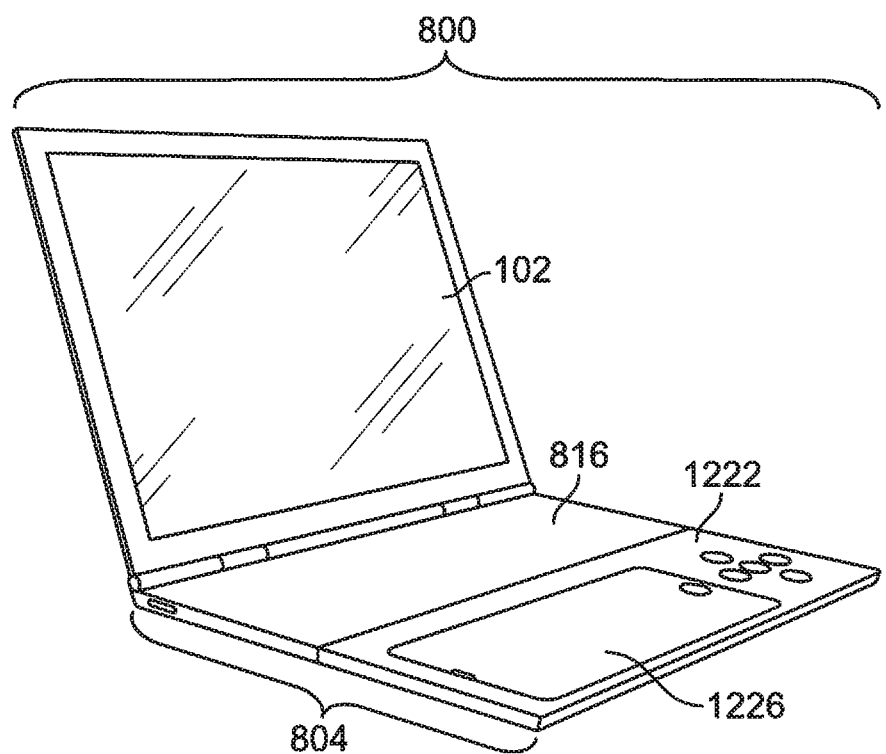
FIG. 12 illustrates the electronic apparatus shown in FIG. 8 with an output device according to one embodiment.
Figure 13:
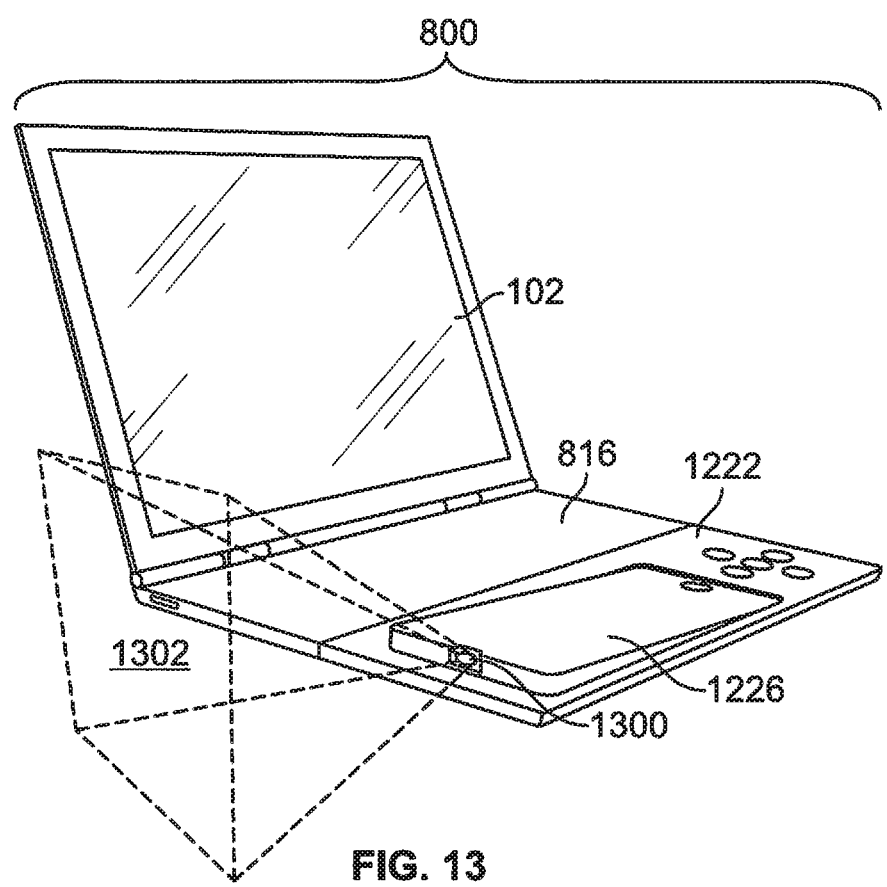
FIG. 13 illustrates the electronic apparatus shown in FIG. 8 with the output device shown in FIG. 12 according to one embodiment.

FIGS. 12 and 13 illustrate the electronic apparatus 800 with an output device 1222 according to one embodiment. The electronic apparatus 800 may have the display subassembly 102 and the housing 816 of the base subassembly 804. This housing 816, however, may be coupled with the output device 1222 instead of being coupled with the input device 822. The output device 1222 can couple with the connector 900 (shown in FIG. 9) of the housing 816.

The output device 1222 may be a projector device that directs light onto a surface remote from the electronic apparatus 800 as a display. For example, the output device 1222 can have a pop-up portion 1226 that pivots relative to an upper surface of a remainder of the output device 1222, as shown in FIG. 13. This pivoting reveals a lens 1300 in the output device 1222. One or more light sources inside the output device 1222 project light 1302 out of the output device 1222 through the lens 1300.

Projection of the light 1302 may be controlled by the processors 128 to allow the processors 128 to visually present information on the surface that is remote from the electronic apparatus 800, such as a wall or screen. The pop-up portion 1226 may be pushed down or may recede downward into the remainder of the output device 1222 (as shown in FIG. 12) when the output device 1222 is no longer projecting the light 1302 onto a surface.

Figure 14:
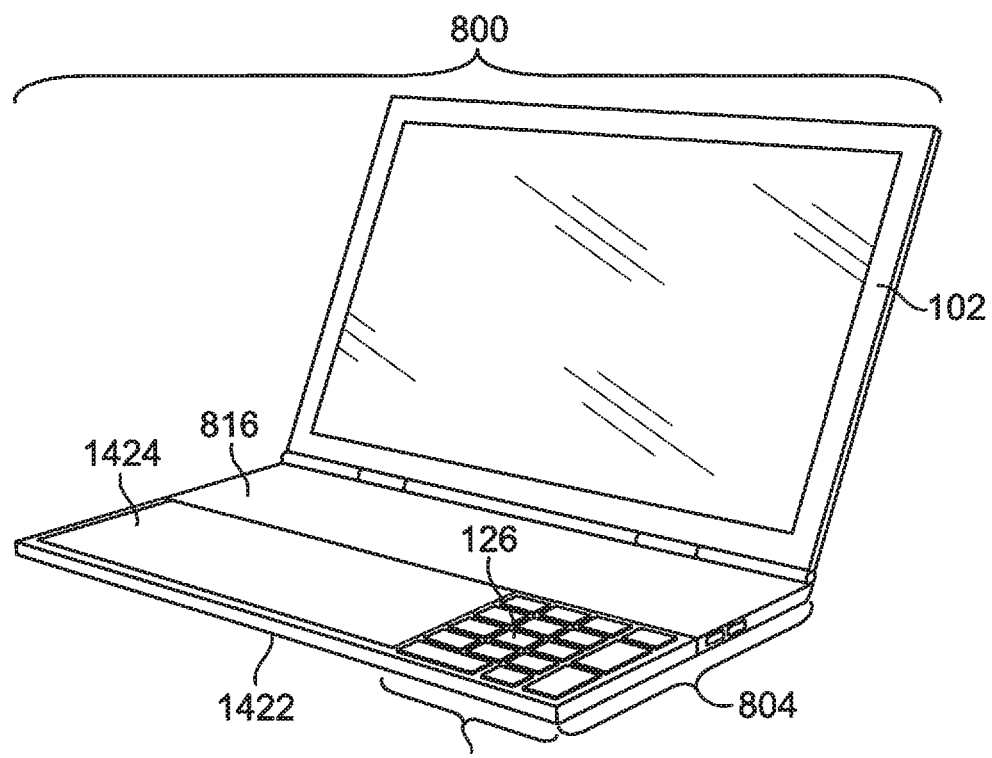
FIG. 14 illustrates the electronic apparatus shown in FIG. 8 with another input device according to one embodiment.

FIG. 14 illustrates the electronic apparatus 800 with another input/output device 1422 according to one embodiment. The input/output device 1422 may be coupled with the connector 900 (shown in FIG. 9) of the housing 816 of the base subassembly 804. The input/output device 1422 includes a keypad 1402 having several keys 126 and a touch sensitive surface or display screen 1424. The touch sensitive surface 1424 is larger than the touch sensitive surface 124 (shown in FIG. 1) of the base subassembly 104 (shown in FIG. 1) and the keypad 1402 may be smaller than the area of the input device 122 (shown in FIG. 1) that includes the keys 126 of the input device 122.

Figure 15:
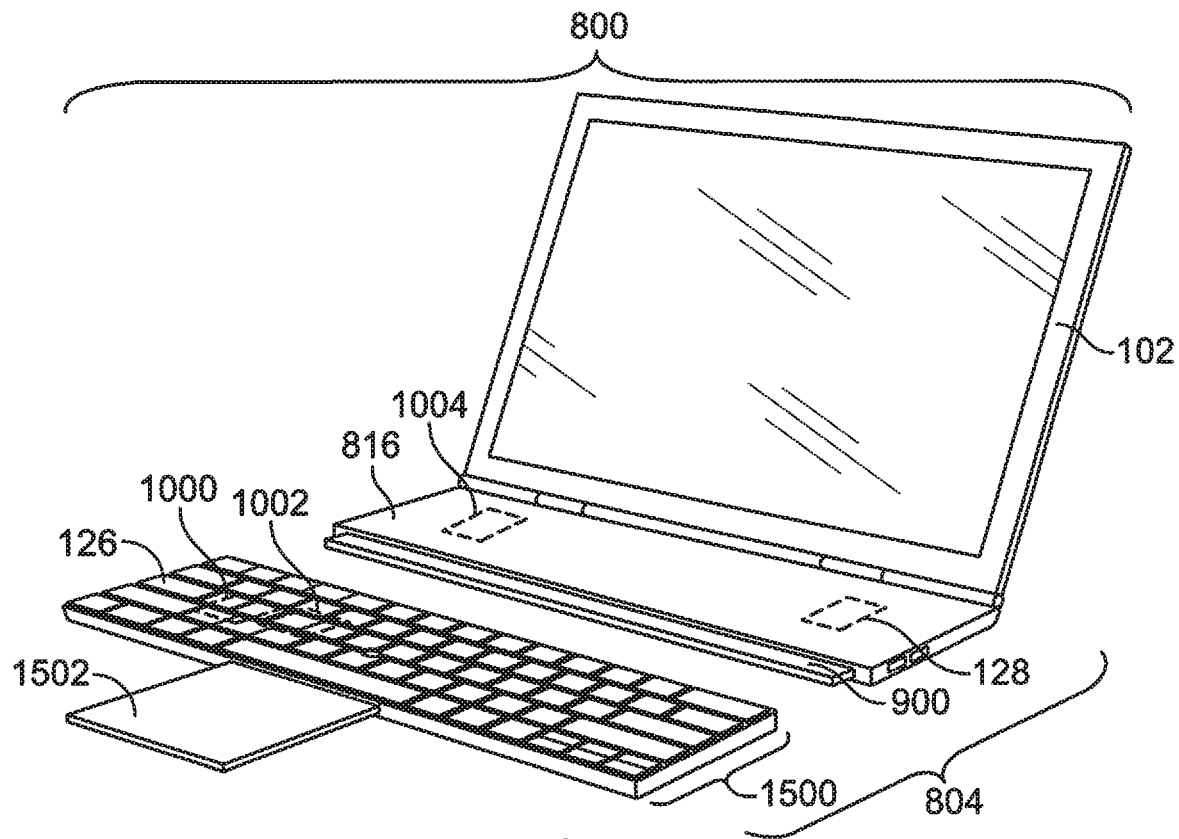
FIG. 15 illustrates the electronic apparatus shown in FIG. 8 with another input device according to one embodiment.
Figure 16:
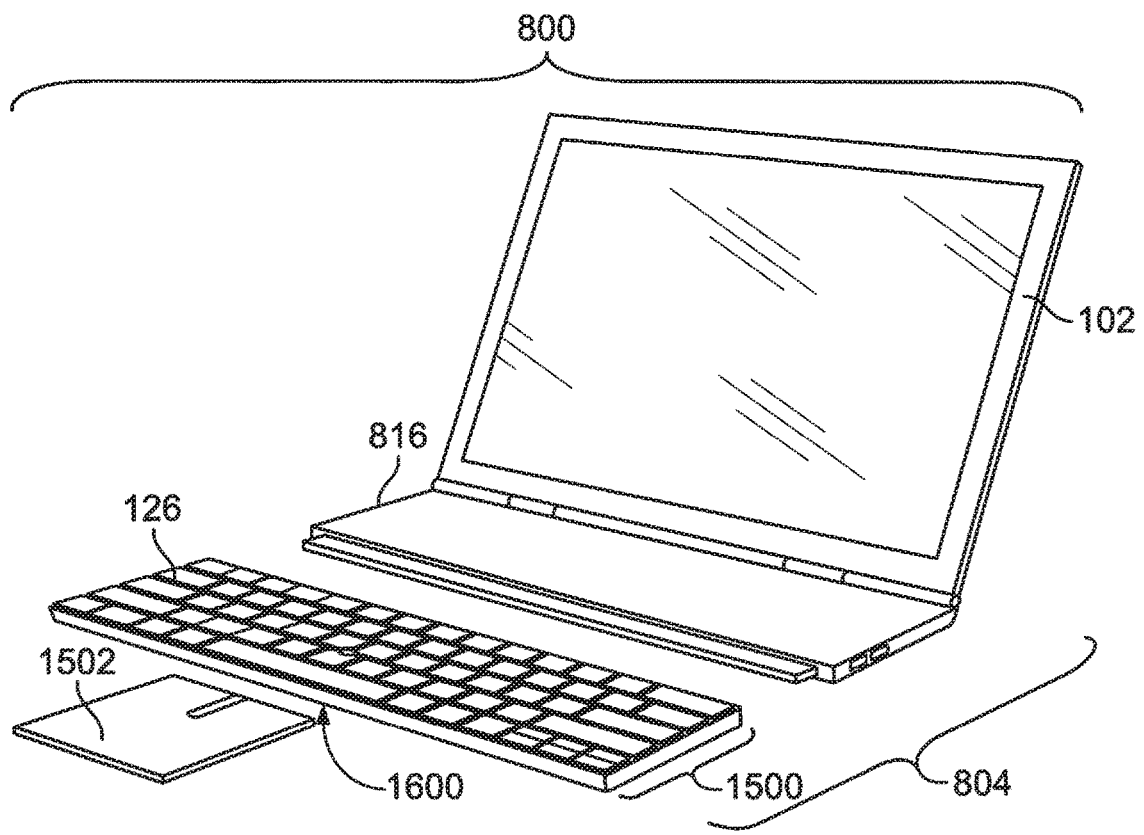
FIG. 16 illustrates the electronic apparatus shown in FIG. 8 with another input device shown in FIG. 15 according to one embodiment.

FIGS. 15 and 16 illustrate the electronic apparatus 800 with another input device 1500 according to one embodiment. The input device 1500 may include the processors 1000 and the transceiving circuitry 1002 (e.g., similar to the input device 822 as shown in FIG. 10) to allow the input device 1500 to wirelessly communicate with the processors 128 in the housing 816 of the base subassembly 804 via the transceiving circuity 1002 in the housing 816. Alternatively, the input device 1500 may not include the transceiving circuitry 1002 and/or the processors 1000, or may be otherwise unable to wirelessly communicate with the processors 128 in the base subassembly 804.

The input device 1500 includes a retractable input device (touchpad) 1502, As shown in FIG. 16, the retractable input device 1502 is stored in an internal chamber 1600 inside the outer housing of the input device 1500. The retractable input device 1502 may be stored inside the chamber 1600 when not in use, and can be pulled out or otherwise retrieved from the chamber 1600 when needed for use. The retractable input device 1502 is shown as a touch sensitive surface or device, but optionally may be a removable travel mouse (shown in FIG. 16).

Figure 17:
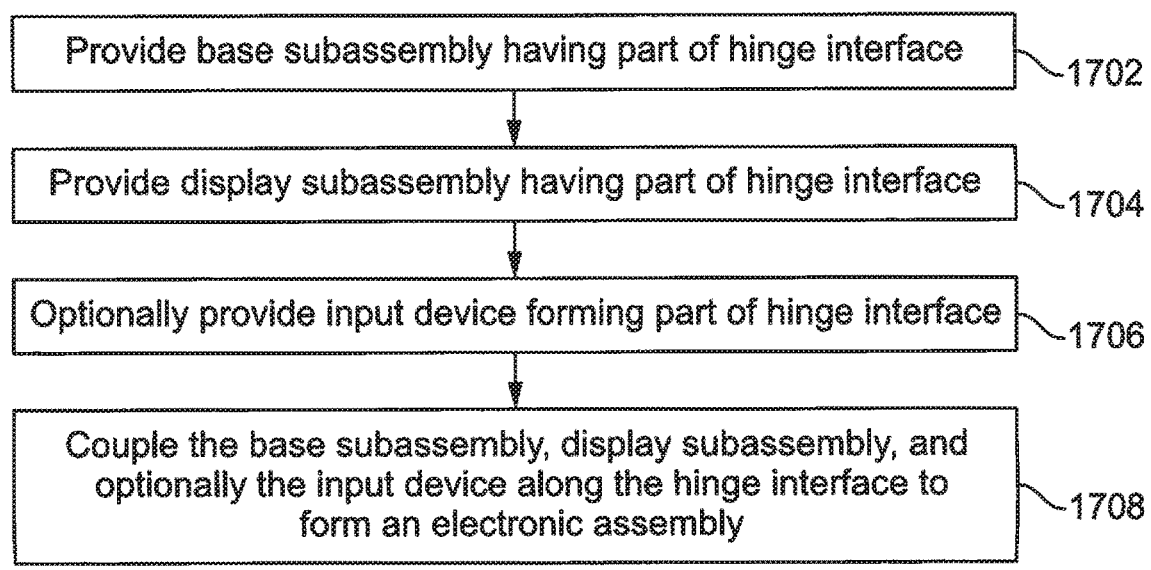
FIG. 17 illustrates a flowchart of one embodiment of a method for providing a convertible electronic apparatus.

FIG. 17 illustrates a flowchart of one embodiment of a method 1700 for providing a convertible electronic apparatus. The method 1700 may be used to manufacture or assemble the electronic assemblies 100, 800 described herein. At 1702, a base subassembly having part of a hinge assembly is provided. This base subassembly may be the base subassembly 104 (shown in FIG. 1), the base subassembly 804 (shown in FIG. 8), or another base subassembly. The base subassembly includes part of the hinge assembly 130 (shown in FIG. 1), such as the hinge recesses 602 (shown in FIG. 6) and/or securing sections 710 (shown in FIG. 7).

As described above, this base subassembly optionally may have or be capable of mating with different input/output devices. These input devices can include the input devices 822, 1222, 1422, 1500 shown in FIGS. 8, 12, 14, and 15, which can be swapped out to provide the base subassembly with the ability to interface with modular input devices.

At 1704, a display subassembly having another part of the hinge assembly is provided. This display subassembly may be the display subassembly 102 shown in FIG. 1. The part of the hinge assembly 130 that is provided with the display subassembly can include the hinge sections 600 (shown in FIG. 6).

At 1706, an input device forming part of the hinge assembly optionally is provided. For example, the input device 134 that fits between and is secured with the securing sections 710 of the base subassembly 104, or the display subassembly 102 may be obtained.

At 1708, the base subassembly, the display subassembly, and optionally the input device are coupled with each other along the hinge assembly to form an electronic apparatus. For example, the hinge sections 600 of the display subassembly 102 may be received into the hinge recesses 602 (shown in FIG. 2) of the base subassembly 104, 804 and the input device 134 optionally may be secured between the securing sections 710 of the base subassembly 104, 804 in order to form the hinge assembly 130 and to form the electronic apparatus 100 described above.

Figure 18:
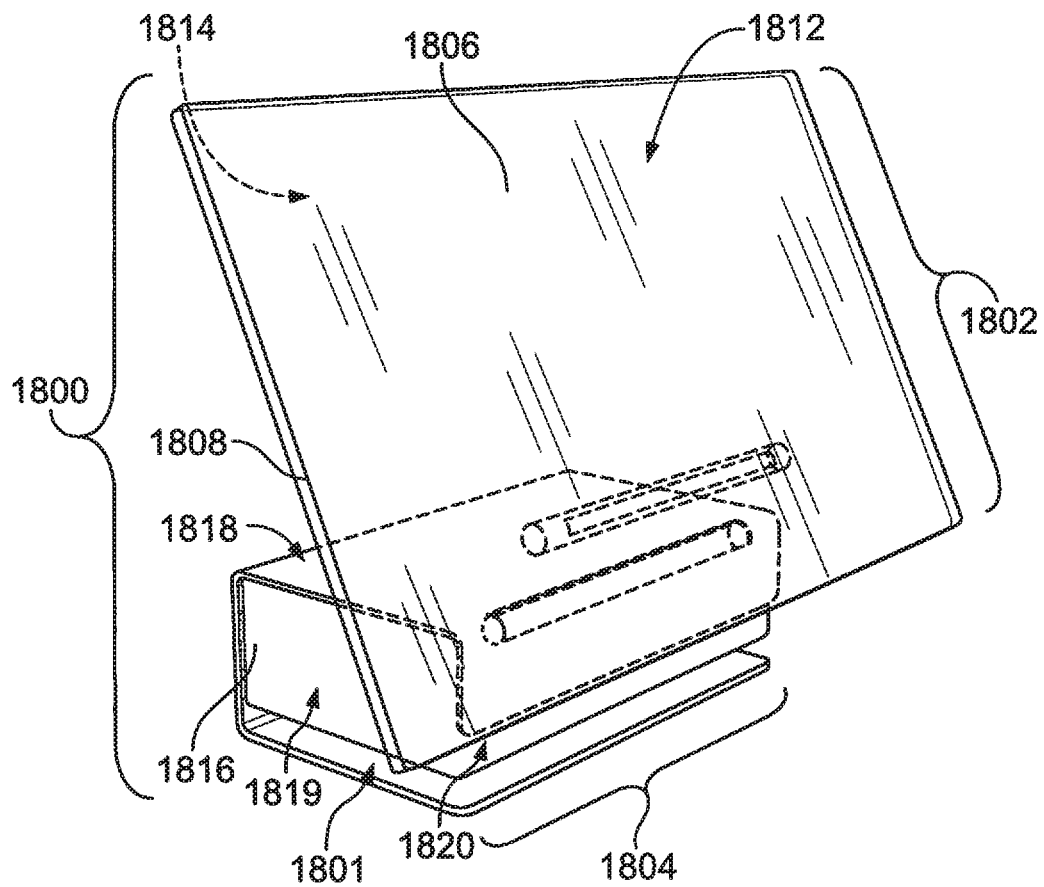
FIG. 18 illustrates a perspective view of another embodiment of an electronic apparatus.

FIG. 18 illustrates a perspective view of another embodiment of an electronic apparatus 1800. Similar to the electronic apparatuses shown in FIGS. 1 through 16, the electronic apparatus 1800 includes a display subassembly 1802 and a base subassembly 1804 that are coupled with each other in the state of the electronic apparatus 1800 shown in FIG. 18. The display subassembly 1802 may be a tablet computer or other electronic device having a display device 1806 and a housing 1808 coupled with the display device 1806. The display device 1806 may be a touchscreen or non-touch sensitive display. The display device 1806 visually presents information to a user of the electronic apparatus 1800, the base subassembly 1804 or the display subassembly 1802. The size of the display device 1806 relative to the base subassembly 1804 is provided as one example. Optionally, the display device 1806 and consequently the housing 1808 and/or display subassembly 1802 may be larger or smaller. The base subassembly 1804 may operate as a computer or computing assembly separately from and/or in conjunction with the display subassembly 1802.

The housing 1808 forms part of the exterior surface of the display subassembly 1802. The display device 1806 is disposed on a front or display side 1812 of the housing 1808. The housing 1808 also includes an opposite rear or non-display side 1814. One or more processors (e.g., the same or similar to the processors 110) may be disposed inside the housing 1808 between the sides 1812, 1814. The processors may receive input (e.g., from the display device 1806 and/or other input devices) to control the information that is shown on the display device 1806.

The base subassembly 1804 includes a housing 1816 that couples with the housing 1808 of the display subassembly 1802. The housing 1816 forms at least part of the exterior surface of the base subassembly 1804. The housing 1816 has opposite exterior surfaces 1818, opposite exterior surfaces 1819, and opposite exterior surfaces 1820. The distance (e.g., perpendicular distance) between the surfaces or sides 1820 may be larger than the distance between the surfaces or sides 1818. One of the surfaces or sides 1820 may be referred to as the front of the base subassembly 1804 and the opposite surface or side 1820 may be referred to as the back of the base subassembly 1804. One of the surfaces or sides 1818 may be referred to as the top of the base subassembly 1804 and the opposite surface or side 1818 may be referred to as the bottom of the base subassembly 1804.

In one embodiment, the base subassembly 1804 also includes one or more processors (e.g., similar or identical to the processors 128) in the housing 1816. These processors may be similar or identical to the processors in the display subassembly 1802. Alternatively, the processors in the base subassembly 1804 may have more processing capability (e.g., power) relative to the processors in the display subassembly 1802. The processors may receive signals from the display device 1806, and can control perform operations based on or using these signals, such as by controlling the information presented on the display device 1806.

The base subassembly 1804 includes a spatial gap 1801 between one of the surfaces 1818 of the housing 1816 and a remainder of the housing 1816. This gap 1801 is sized to receive a keyboard for storage and/or charging. The gap 1801 may be formed by one of the medium exterior surfaces 1820 extending from one exterior surface 1818 to the opposite exterior surface 1818, but the other exterior surface 1820 may extend from one exterior surface 1818 and not all the way to the opposite exterior surface 1818. The gap 1801 also may be formed by one exterior surface 1819 extending from one exterior surface 1818 but not all the way to the opposite exterior surface 1818.

Figure 19:
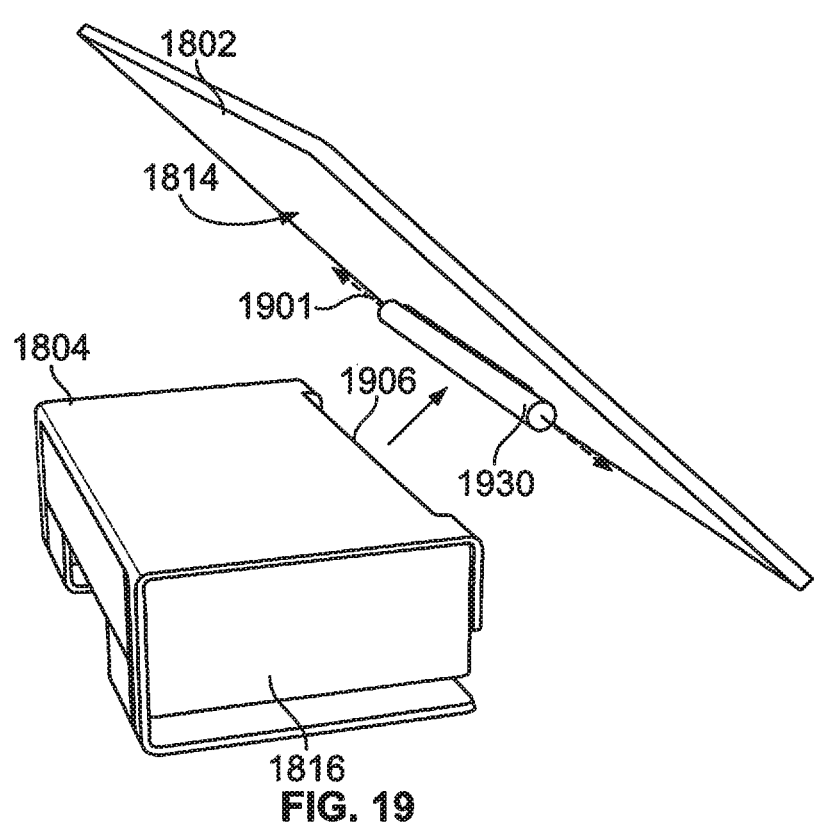
FIG. 19 illustrates a rear perspective view of the electronic apparatus shown in FIG. 18.
Figure 20:
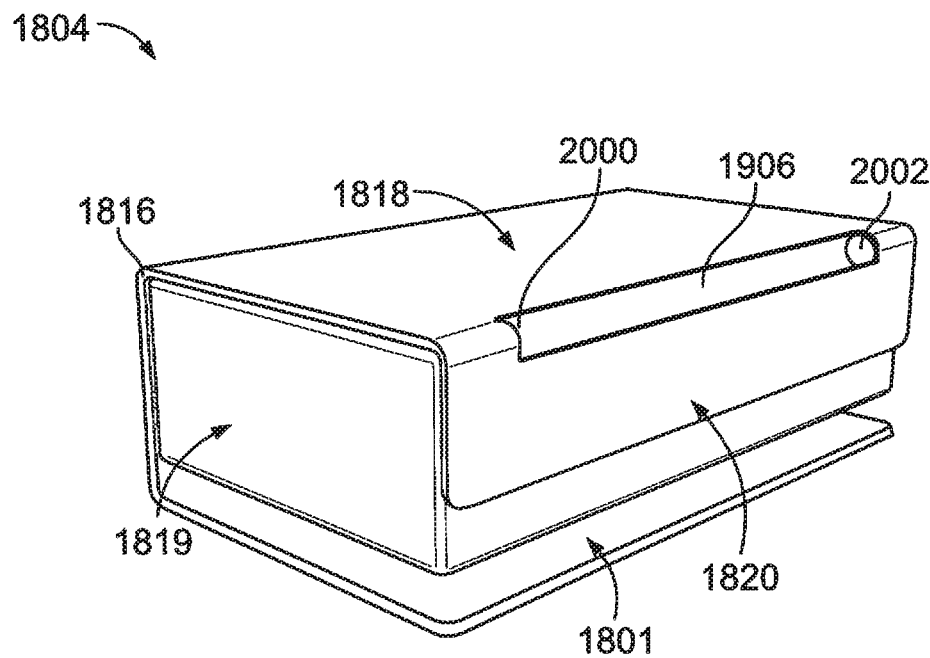
FIG. 20 illustrates a perspective view of a base subassembly shown in FIG. 18 according to one embodiment.

FIG. 19 illustrates a rear perspective view of the electronic apparatus 1800 shown in FIG. 18 and FIG. 20 illustrates a perspective view of the base subassembly 1804 according to one embodiment. The display subassembly 1802 and the base subassembly 1804 are connected with each other along an elongated hinge or connector assembly 1930. The connector assembly 1930 is disposed along the back side 1814 of the display subassembly 1802 and couples with an elongated connector receptacle or recess 1906 in the housing 1816 of the base subassembly 1804. In the illustrated embodiment, the connector assembly 1930 has a cylindrical or partially cylindrical shape and the receptacle 1906 has a complementary shape to receive the connector assembly 1930. The connector assembly 1930 provides for the ability to pivot the subassemblies 1802, 1804 relative to each other to a variety of angles, to maintain the orientation of the subassemblies 1802, 1804 relative to each other, and/or to transfer data and/or electrical power current) between the subassemblies 1802, 1804.

The connector receptacle or recess 1930 is located at an intersection between one of the exterior surfaces 1818 and one of the medium exterior surfaces 1820 of the base subassembly 1804 in the illustrated embodiment. The connector assembly 1930 is received into the receptacle 1906 and allows the display subassembly 1802 to pivot about or around an axis 1901 defined by or extending through the connector assembly 1930. Alternatively, the connector assembly 1930 is part of or extends from the base subassembly 1804 and the connector receptacle 1906 is part of or extends into the display subassembly 1802.

The connector receptacle 1906 may not extend across the entire width of the medium exterior surface 1820. Instead, opposite ends 2000, 2002 (shown in FIG. 20) of the connector receptacle 1906 may be spaced apart from the smaller exterior surfaces or sides 1819. Alternatively, the connector receptacle 1906 may extend to one or both of the smaller exterior surfaces or sides 1819, thereby allowing the connector assembly 1930 to slide into the receptacle 1906 from the side (e.g., in a direction along the axis 1901).

Figure 21:
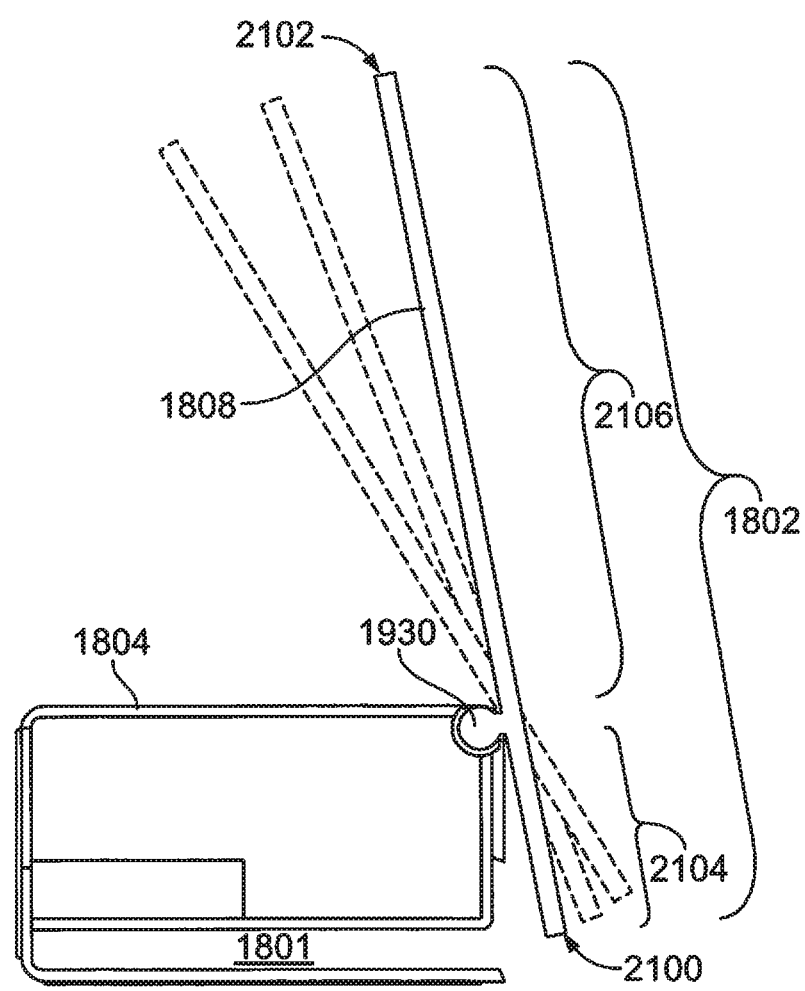
FIG. 21 illustrates a side view of the electronic apparatus shown in FIGS. 18 through 20.

FIG. 21 illustrates a side view of the electronic apparatus 1800 shown in FIGS. 18 through 20. The connection between the connector assembly allows the display subassembly 1802 and the base subassembly 1804 to pivot relative to each other in directions around or about the axis 1901 (shown in FIG. 19) extending along the connector assembly 1930. In the illustrated embodiment, the connector assembly 1930 is located closer to one end or edge 2100 of the housing 1808 of the display subassembly 1802 than an opposite end or edge 2102 of the housing 1808 of the display subassembly 1802. This results in a shorter portion 2104 of the display subassembly 1802 moving away from the base subassembly 1804 and a longer portion 2106 of the display subassembly 1802 moving toward the base subassembly 1804 when the display subassembly 1802 pivots around or about the axis 1901 in one direction, and the shorter portion 2104 of the display subassembly 1802 moving toward the base subassembly 1804 and the longer portion 2106 of the display subassembly 1802 moving away from the base subassembly 1804 when the display subassembly 1802 pivots around or about the axis 1901 in an opposite direction. The shorter portion 2104 extends from the location of the connector assembly 1930 to the end or edge 2100, and the longer portion 2102 extends from the location of the connector assembly 1930 to the opposite end or edge 2102.

The connector assembly 1930 and/or the receptacle 1906 can include conductive contacts that engage one another for data transfer and/or power transfer between the subassemblies 1802, 1804. This can allow for the computing assembly 1800 to operate as a computer base (e.g., the base subassembly 1804) and a monitor (e.g., the display subassembly 1802) without the use or need for additional wires or cables between the base and monitor. The connector assembly 1930 and/or the receptacle 1906 can include magnets, a press fit connection, and/or a friction fit connection that secure the subassemblies 1802, 1804 together and allows for the orientation of the display subassembly 1802 relative to the base subassembly 1804 to be maintained. The connection between the connector assembly 1930 and the connector receptacle 1906 provides for a pivoting connection between the display and base subassemblies 1802, 1804, that optionally also provides connections for power and/or data transfer, without having any moving parts or components (other than the display and base subassemblies 1802, 1804).

Placing the connection between the subassemblies 1802, 1804 at the intersection between the exterior surface or side 1818 of the base subassembly 1804 allows for a wider range of angles at which the display subassembly 1802 can be oriented relative to the base subassembly 1804. This corner location of the connection allows for larger angle adjustability of the display subassembly 1802 from a vertical orientation to a horizontal orientation. This can allow the display subassembly 1802 to be parallel to the front side 1820 of the base subassembly 1804 or parallel to the top side 1818 of the base subassembly 1804. FIGS. 27 through 32 illustrate some, but not all, of the orientations or angles at which the display subassembly 1802 may be relative to the base subassembly 1804 while the subassemblies 1802, 1804 are coupled with each other.

Figure 22:
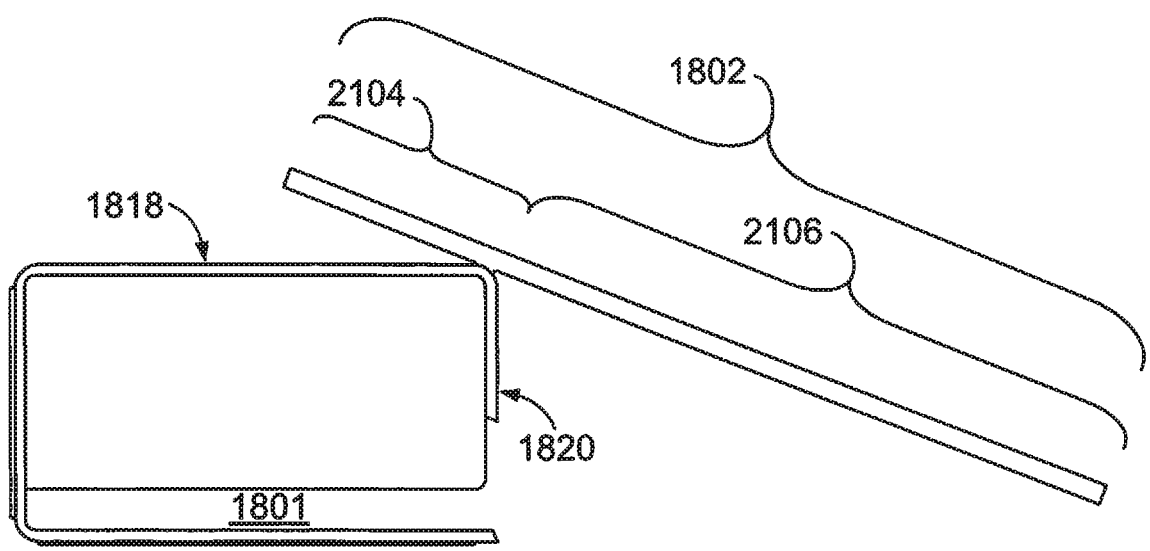
FIG. 22 illustrates another side view of the computing apparatus shown in FIGS. 18 through 21.

FIG. 22 illustrates another side view of the electronic apparatus 1800 shown in FIGS. 18 through 21. The connection between the display subassembly 1802 and the base subassembly 1804 may be reversed relative to the connection shown in FIGS. 18 through 21. For example, in FIGS. 18 through 21, the shorter portion 2104 of the display subassembly 1802 is closer to one of the medium exterior surfaces 1820 of the base subassembly 1804 than any other of the exterior surfaces 1818, 1819 of the base subassembly 1804 and the longer portion 2106 of the display subassembly 1802 is closer to one of the exterior surfaces 1818 of the base subassembly 1804 than any other of the exterior surfaces 1819, 1820 of the base subassembly 1804.

The display subassembly 1802 can be flipped relative to the base subassembly 1804 and connected with the base subassembly 1804 so that the shorter portion 2104 of the display subassembly 1802 is closer to one of the exterior surfaces 1818 of the base subassembly 1804 than any other of the exterior surfaces 1819, 1820 of the base subassembly 1804 and the longer portion 2106 of the display subassembly 1802 is closer to one of the medium exterior surfaces 1820 of the base subassembly 1804 than any other of the exterior surfaces 1818, 1819 of the base subassembly 1804, as shown in FIG. 22. This provides additional viewing angles by which the display subassembly 1802 can be viewed.

Figure 23:
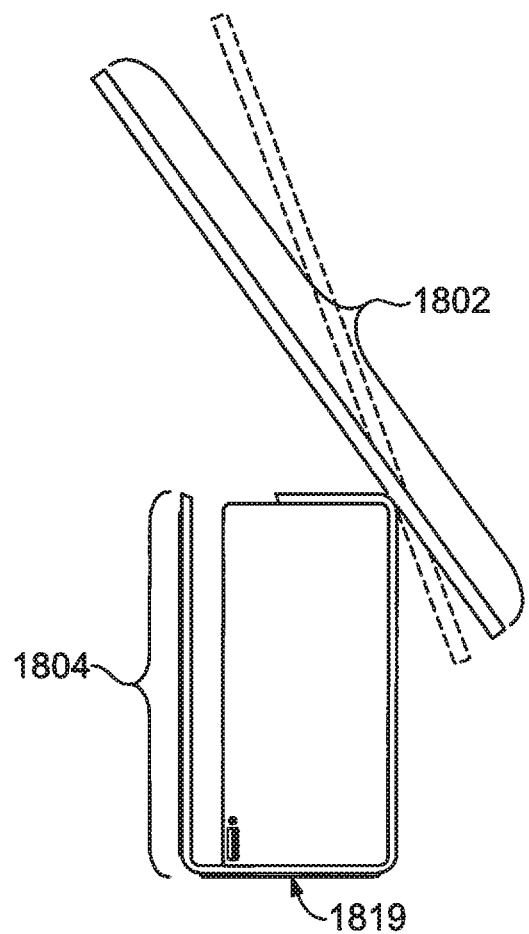
FIG. 23 illustrates another side view of the electronic apparatus shown in FIGS. 18 through 22.

FIG. 3 illustrates another side view of the electronic apparatus 1800 shown in FIGS. 18 through 22. The base subassembly 1804 is shown in FIGS. 18 through 22 with the bottom exterior surfaces 1818 resting or sitting upon a surface, such as a table, floor, shelf, etc. The base subassembly 1804 may instead be positioned to rest on the back exterior surface 1819, as shown in FIG. 23, which raises the location of the connection point (e.g., 1906) between the subassemblies 1802, 1804. The display subassembly 1802 may be connected with the base subassembly 1804 as described above to provide additional viewing angles or options without requiring or using any additional lifting mechanisms.

Figure 24:
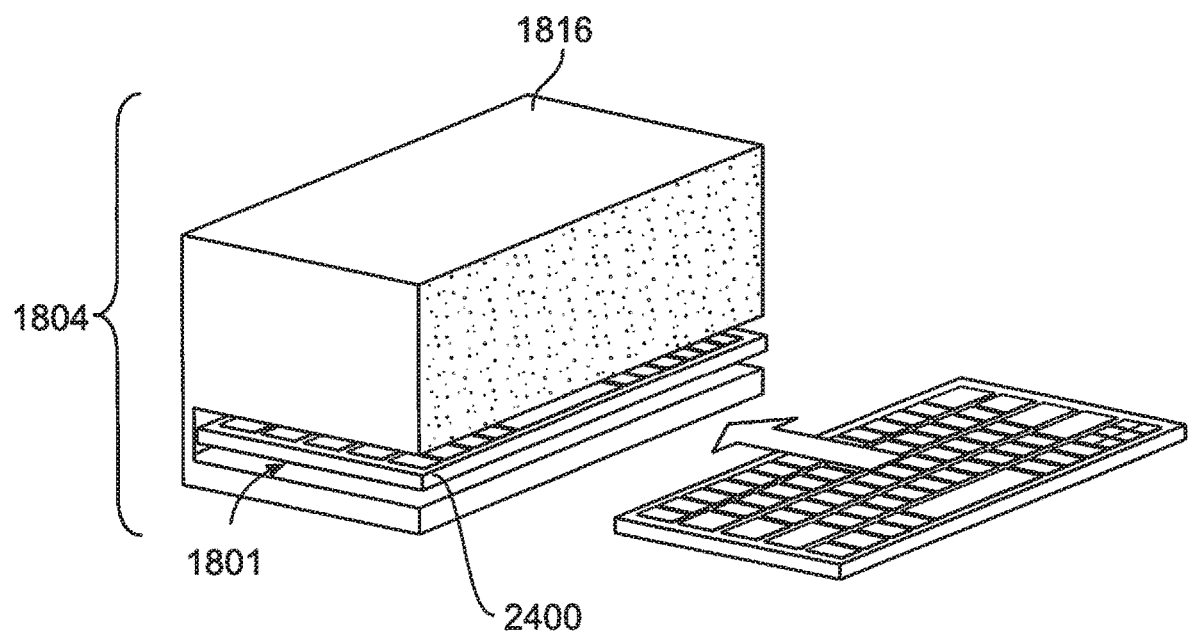
FIG. 24 illustrates another perspective view of the base subassembly shown in FIG. 18.

FIG. 24 illustrates another perspective view of the base subassembly 1804 shown in FIG. 18. The base subassembly 1804 may receive and store (or hold) another computing subassembly 2400 within the gap 1801 of the housing 1816 of the base subassembly 1804. In the illustrated embodiments, the gap 1801 is located closer to one of the larger exterior surfaces or sides 1818 of the housing 1816 than the opposite side 1818. Alternatively, the gap 1801 may be in another location. The computing subassembly 2400 may be one or more of the input devices 122, 822, 1500 described above. For example, the subassembly 2400 may be a keyboard that is connected with the processor(s) in the base subassembly 1804 wirelessly and/or via one or more wired connections accessible inside the gap 1801 (not visible in FIG. 24). The gap 1801 may be used to store the subassembly 2400 when not in use.

Figure 25:
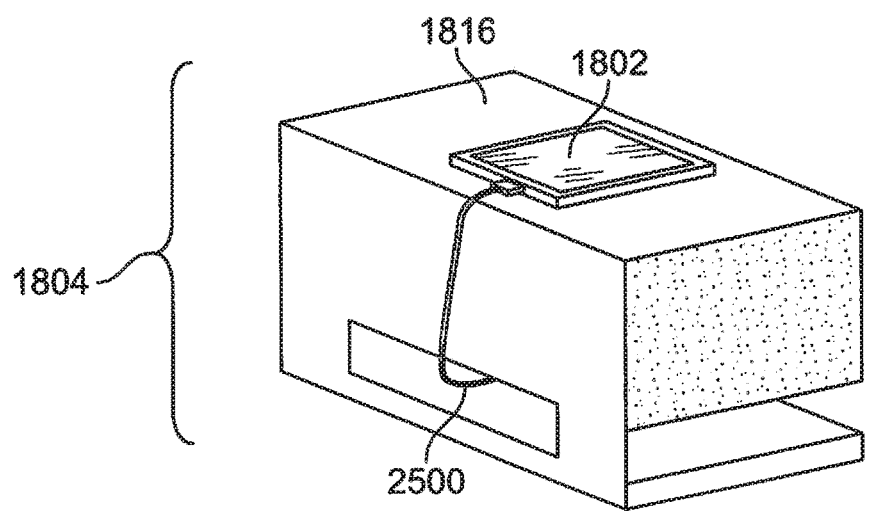
FIG. 25 illustrates a rear perspective view of the base subassembly according to one embodiment.

FIG. 25 illustrates a rear perspective view of the base subassembly 1804 according to one embodiment. The housing 1816 of the base subassembly 1804 may have one or more wired connections 2500 (e.g., cables or wires) and/or connectors that allow a cell phone or another computing subassembly to be conductively connected with the base subassembly 1804. This can allow for the base subassembly 1804 to charge the cell phone or another computing subassembly, communicate data with the cell phone or another computing subassembly, or the like, via the connections 2500 or connectors.

Figure 26:
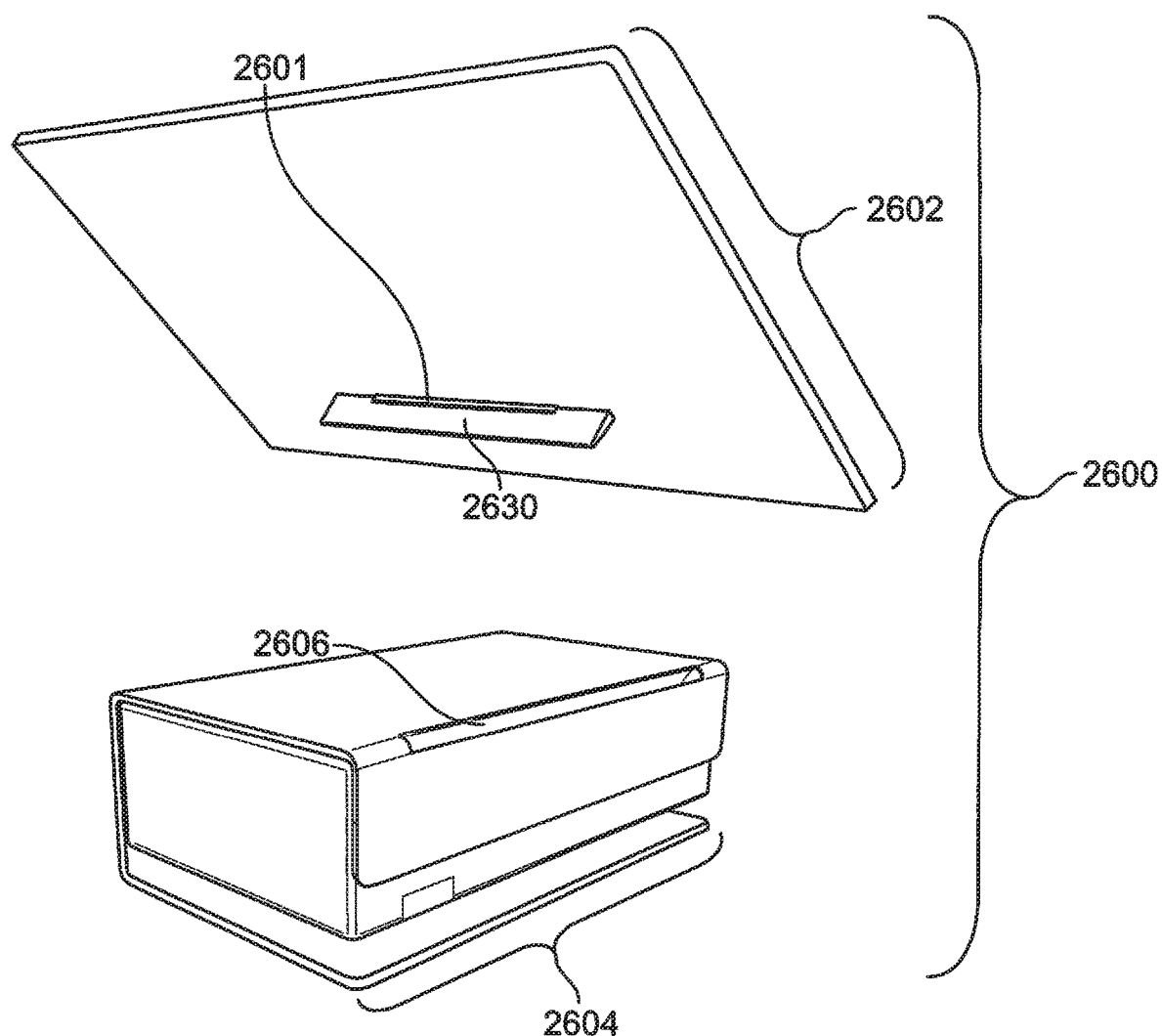
FIG. 26 illustrates an exploded view of a computing apparatus according to another embodiment.
Figure 27:
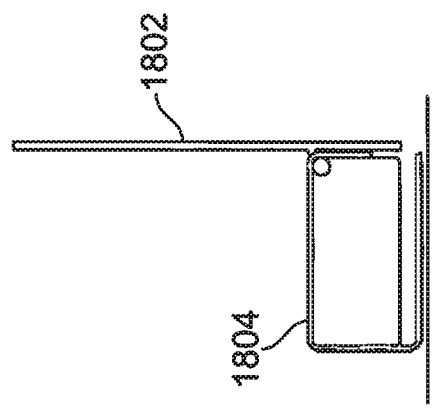
FIG. 27 illustrates an orientation or angle at which the display subassembly shown in FIG. 18 may be relative to the base subassembly shown in FIG. 18 while the subassemblies are coupled with each other.
Figure 28:
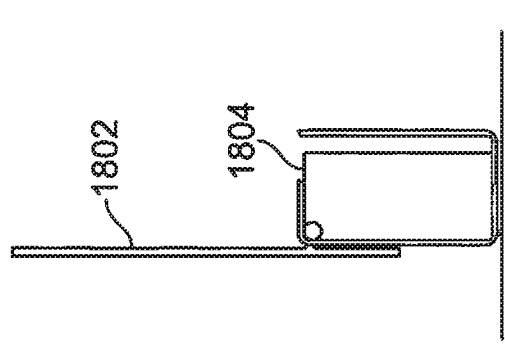
FIG. 28 illustrates another orientation or angle at which the display subassembly shown in FIG. 18 may be relative to the base subassembly shown in FIG. 18 while the subassemblies are coupled with each other.
Figure 29:
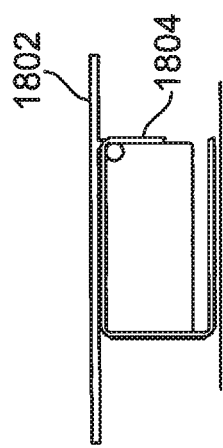
FIG. 29 illustrates another orientation or angle at which the display subassembly shown in FIG. 18 may be relative to the base subassembly shown in FIG. 18 while the subassemblies are coupled with each other.
Figure 30:
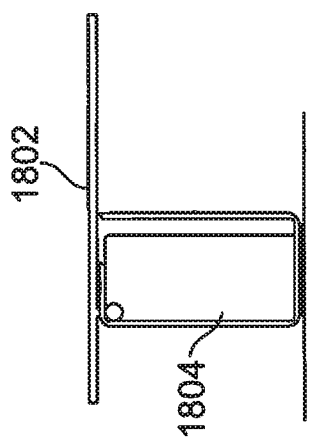
FIG. 30 illustrates another orientation or angle at which the display subassembly shown in FIG. 18 may be relative to the base subassembly shown in FIG. 18 while the subassemblies are coupled with each other.
Figure 31:
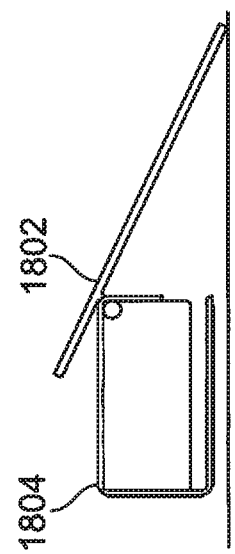
FIG. 31 illustrates another orientation or angle at which the display subassembly shown in FIG. 18 may be relative to the base subassembly shown in FIG. 18 while the subassemblies are coupled with each other.
Figure 32:
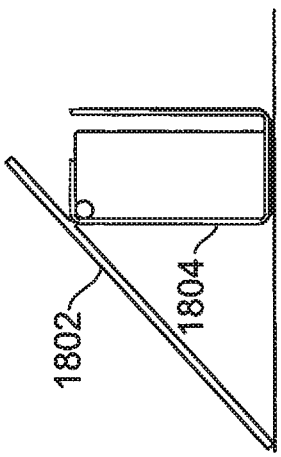
FIG. 32 rates another orientation or angle at which the display subassembly shown in FIG. 18 may be relative to the base subassembly shown in FIG. 18 while the subassemblies are coupled with each other.

FIG. 26 illustrates an exploded view of a computing apparatus 2600 according to another embodiment. The computing apparatus 2600 includes a display subassembly 2602 (which may be similar to the display subassembly 1802) and a base subassembly 2604 (which may be similar to the base subassembly 1804). One difference between the computing apparatus 2600 and the electronic apparatus 1800 is a connector assembly 2630 and a connector receptacle 2606. The connector assembly 1930 of the electronic apparatus 1800 is cylindrically shaped and the connector receptacle 1906 of the electronic apparatus 1800 has a complementary shape (e.g., that of a cylindrical or partially cylindrical recess).

In contrast, the connector assembly 2630 shown in FIG. 26 has a flat shape that projects from the display subassembly 2602 and the connector receptacle 2606 shown in FIG. 26 has a complementary shaped recess (e.g., a slot extending into the base subassembly 2604). The flat shape of the connector assembly 2630 can be referred to as a tongue or planar shape, that is connected to the back of the display by a hinge assembly 2601. The connector assembly 2630 may be connected with the display subassembly 2602 (or to the base subassembly 2604) by the hinge assembly 2601 to allow the display subassembly 2602 to pivot relative to the base subassembly 2604 when the connector assembly 2630 mates with the connector receptacle 2606.

In one embodiment, the display subassemblies described herein may operate without the base subassemblies described herein, and optionally may be interchangeable between base subassemblies. For example, a wall in a room, a surface of a table or other furniture, etc., may include the connector receptacle that receives the connector assembly of a display subassembly to allow the display subassembly to be oriented in a variety of angles while optionally transferring data and/or power between the display subassembly and one or more other electronic subassemblies or assemblies connected with the receptacle.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to, wireless, wireline, optical fiber cable, RF, etcetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic apparatus comprising:
a display subassembly including display device that visually presents information, a housing, and a connector, the housing comprising opposite first and second edges and a display surface extending therebetween;
a base subassembly including a housing having a connector recess that receives the connector of the display subassembly; and
one or more processors that control presentation of the information on the display subassembly, at least one processor of the one or more processors located in the base subassembly;
wherein the connector of the display subassembly is sized to be at least partially received into the connector recess of the base subassembly to connect the display subassembly in an operable configuration with the base subassembly and the at least one processor located in the base subassembly while allowing the display subassembly to pivot relative to the base subassembly; and
wherein a first portion of the display surface of the display subassembly is configured to move in a direction towards the base subassembly while a second portion of the display surface of the display subassembly is configured to move in a direction away from the base subassembly responsive to the display subassembly pivoting relative to the base subassembly.

2. The electronic apparatus of claim 1, wherein the connector of the display subassembly and the connector recess of the base subassembly include conductive contacts positioned to engage each other and transfer electric current between the display subassembly and the base subassembly.

3. The electronic apparatus of claim 1, wherein the connector recess of the base subassembly is located at an interface between different exterior sides of the housing of the base subassembly.

4. The electronic apparatus of claim 1, wherein the connector is coupled with the housing of the display subassembly in a location that is a distance away from the first edge and a distance away from the second edge.

5. The electronic apparatus of claim 1, wherein the connector and the connector recess include magnets to secure the connector to the connector recess.

6. The electronic apparatus of claim 1, wherein the connector and the connector recess are sized to secure to each other by a friction fit.

7. The electronic apparatus of claim 1, wherein the connector has a cylindrical shape and the connector recess has a complementary shape to receive the cylindrical shape of the connector.

8. The electronic apparatus of claim 1, wherein the connector has a flat shape and the connector recess has a complementary slot shape to receive the flat shape of the connector.

9. The electronic apparatus of claim 1, wherein the connector is shaped to pivot within and relative to the connector recess.

10. The electronic apparatus of claim 1, wherein the connector of the display subassembly is selectively receivable into the connector recess of the base subassembly in a plurality of relative orientations between the display subassembly and the base subassembly.

11. An electronic subassembly comprising:
a housing having a connector recess that receives a connector of a display subassembly, the housing having a top exterior surface, and an opposite bottom exterior surface, the display subassembly comprising opposite first and second edges and a display surface extending therebetween; and
one or more processors that control presentation of information on the display subassembly, at least one processor of the one or more processors located in the housing;
wherein the connector recess of the housing is sized to at least partially receive the connector of the display subassembly to connect the display subassembly in an operable configuration with the housing and with the at least one processor located in the housing while allowing a first portion of the display surface of the display subassembly to pivot to a position above the top exterior surface and while allowing a second portion of the display surface of the display subassembly to pivot to a position below the top exterior surface of the housing relative to the housing.

12. The electronic subassembly of claim 11, wherein the connector recess includes a conductive contact positioned to engage a conductive contact of the connector of the display subassembly.

13. The electronic subassembly of claim 11, wherein the connector recess is located at an interface between different exterior sides of the housing.

14. The electronic subassembly of claim 11, wherein the connector recess includes a magnet that secures the connector of the display subassembly to the connector recess.

15. The electronic subassembly of claim 11, wherein the connector recess is sized to be secured with the connector of the display subassembly by a friction fit.

16. The electronic subassembly of claim 11, wherein the connector recess has a cylindrical shape to receive a cylindrical shape of the connector of the display subassembly.

17. The electronic subassembly of claim 11, wherein the connector recess has a slot shape to receive a flat shape of the connector of the display subassembly.

18. The electronic subassembly of claim 11, wherein the connector recess is shaped to receive the connector of the display subassembly and allow the connector to pivot within and relative to the connector recess.

19. An electronic subassembly comprising:
a display device that visually presents information;
a housing with one or more processors that control presentation of the information on the display device, wherein the housing comprises a display surface that extends between opposite first and second edges; and
a connector sized to be at least partially received into a connector recess of a base subassembly to connect the housing and the one or more processors in an operable configuration with the base subassembly while allowing the display surface of the housing to pivot about the connector relative to the base subassembly, wherein the connector is coupled with the housing in a location that is a distance away from the first edge and a distance away from the second edge.

20. The electronic subassembly of claim 19, wherein the connector includes a conductive contact positioned to engage a conductive contact in the connector recess of the base subassembly.

21. The electronic subassembly of claim 19, wherein the connector is coupled with the housing in a location that is closer to the first edge than the second edge.

* * * * *